(12) United States Patent
Koike et al.

(10) Patent No.: US 7,356,370 B2
(45) Date of Patent: Apr. 8, 2008

(54) DATA PROCESSING CIRCUIT, DATA PROCESSING APPARATUS, DATA PROCESSING METHOD, DATA PROCESSING CONTROL METHOD, RECORDING MEDIUM ON WHICH DATA PROCESSING PROGRAM IS STORED AND RECORDING MEDIUM ON WHICH DATA PROCESSING CONTROL PROGRAM IS STORED

(75) Inventors: Takashi Koike, Kanagawa (JP); Koji Yoshimura, Kanagawa (JP); Manabu Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 258 days.

(21) Appl. No.: 11/332,298

(22) Filed: Jan. 17, 2006

(65) Prior Publication Data

US 2006/0190108 A1   Aug. 24, 2006

(30) Foreign Application Priority Data

Jan. 31, 2005   (JP)   ............................. 2005-024355

(51) Int. Cl.
  *G05B 11/01* (2006.01)
  *G06F 13/28* (2006.01)
(52) U.S. Cl. ......................................... 700/18; 710/23
(58) Field of Classification Search ...................... None
  See application file for complete search history.

(56) References Cited

U.S. PATENT DOCUMENTS 5,881,203 A * 3/1999 Fujinami et al. ............. 386/96
6,008,751 A * 12/1999 Kudoh ......................... 342/70
6,192,189 B1 * 2/2001 Fujinami et al. ............. 386/96
6,754,847 B2 * 6/2004 Dalal et al. ................... 714/27
7,058,681 B1 * 6/2006 Uno et al. ................... 709/203
7,280,693 B2 * 10/2007 Kurokawa et al. .......... 382/173
2002/0006228 A1 * 1/2002 Suzuki et al. ............... 382/233
2002/0051157 A1 * 5/2002 Ishikawa ..................... 358/1.9
2004/0107109 A1 * 6/2004 Nakanishi et al. ............. 705/1
2004/0160875 A1 * 8/2004 Sasaki ...................... 369/53.15
2005/0025178 A1 * 2/2005 Shirota et al. .............. 370/466
2006/0195908 A1   8/2006 Oishi et al.
2006/0212944 A1   9/2006 Hara et al.

FOREIGN PATENT DOCUMENTS

JP        6-150540        5/1994

* cited by examiner

*Primary Examiner*—Thomas K Pham
(74) *Attorney, Agent, or Firm*—Oblon, Spivak, McClelland, Maier & Neustadt, P.C.

(57) ABSTRACT

A data processing circuit is disclosed which can process data precisely while the processing load to a controlling source is reduced. An information detection section detects, from within data read out from a buffer memory and having attribute information, the attribute information. A data processing section processes, in response to the attribute information detected by the information detection section, data corresponding to the attribute information. A real time control section controls at least one of the information detection section and the data processing section in accordance with a control instruction for real time processing inputted from the outside.

14 Claims, 11 Drawing Sheets

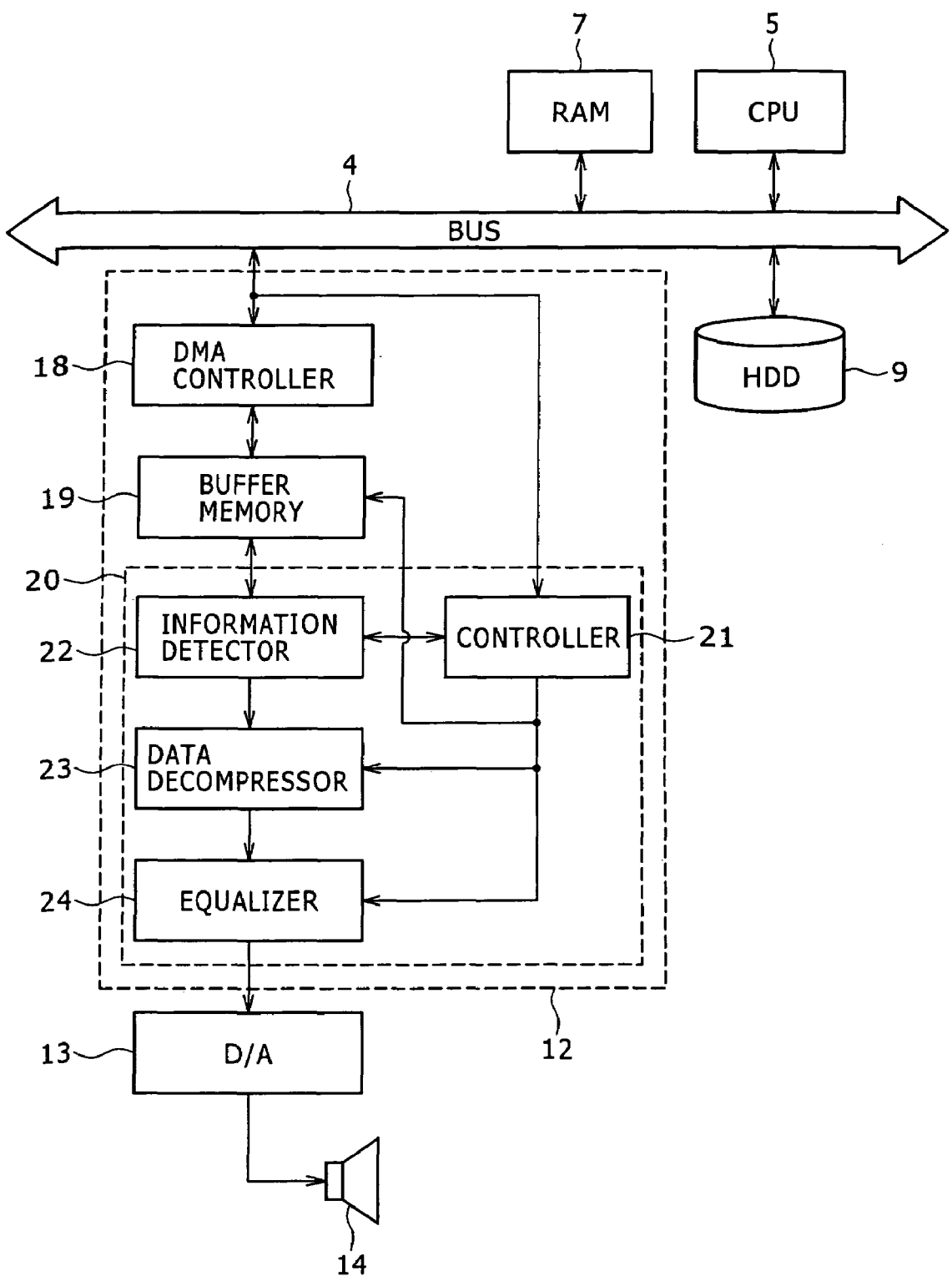

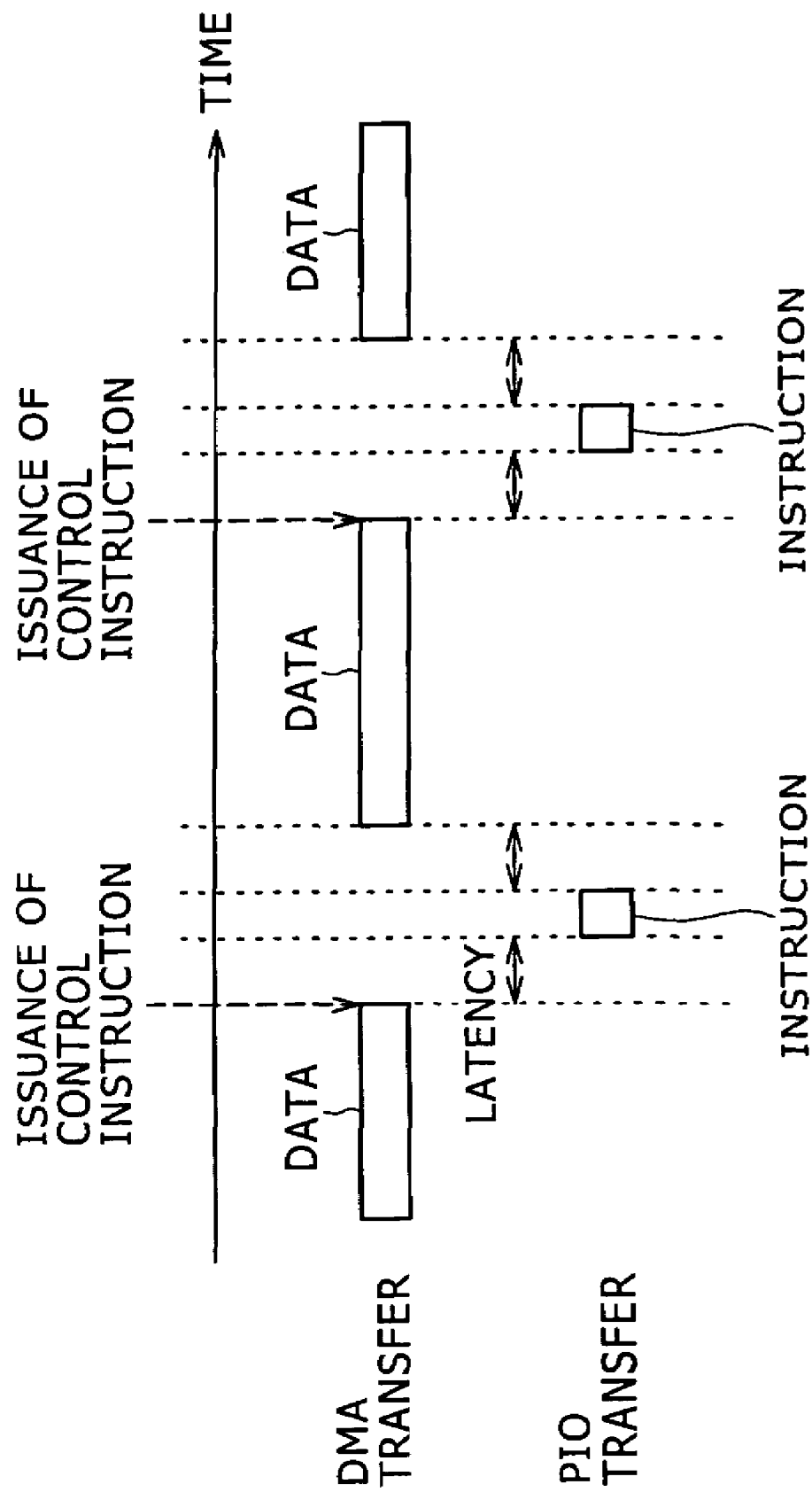

DATA PROCESSING CIRCUIT, DATA PROCESSING APPARATUS, DATA PROCESSING METHOD, DATA PROCESSING CONTROL METHOD, RECORDING MEDIUM ON WHICH DATA PROCESSING PROGRAM IS STORED AND RECORDING MEDIUM ON WHICH DATA PROCESSING CONTROL PROGRAM IS STORED

CROSS REFERENCES TO RELATED APPLICATIONS

The present invention contains subject matter related to Japanese Patent Application JP 2005-024355 filed with the Japanese Patent Office on Jan. 31, 2005, the entire contents of which being incorporated herein by reference.

BACKGROUND OF THE INVENTION

This invention relates to a data processing circuit and can be applied suitably, for example, to a recording and reproduction apparatus for recording and reproducing music data and particularly to a data processing circuit provided in a data processing apparatus such as a personal computer and a music reproduction apparatus.

A conventional disk reproduction apparatus includes a system controller for controlling the entire disk reproduction apparatus such that music data (hereinafter referred to as compressed music data) compression coded in advance and recorded on a magneto-optical disk are read out at a first rate for each predetermined recording unit and also address data of such compressed music data for each recording unit (hereinafter referred to as recording unit compressed music data) on the magneto-optical disk is read out. Then, the disk reproduction apparatus temporarily and cumulatively stores the recording unit compressed music data successively read out from the magneto-optical disk in this manner in a coordinated relationship with the address data into a RAM (Random Access Memory) serving as a buffer memory.

Further, the disk reproduction apparatus successively reads out the recording unit compressed music data at a second rate lower than the first rate from the RAM and decompresses the read out compressed music data by means of a data decompression circuit. Then, the disk reproduction apparatus converts music data obtained by the decompression from digital data into an analog signal and signals the analog signal to a headphone or the like. Consequently, even if it is temporarily rendered difficult to read out the recording unit compressed music data from the magneto-optical disk by vibration of the disk reproduction apparatus applied from the outside, the disk reproduction apparatus can continue to successively read out the recording unit compressed music data cumulatively stored in the RAM from the RAM for a period of time until reading out of the recording unit compressed music data is re-started. Accordingly, such a disk reproduction apparatus as described above prevents intermittent interruption of sound of the music outputted from the headphone or the like when the recording unit compressed music data are read out from a magneto-optical disk and processed for reproduction. A disk reproduction apparatus of the type described is disclosed, for example, in Japanese Patent Laid-Open No. Hei 6-150540 (pages 2 and 4 and FIG. 3, hereinafter referred to as Patent Document 1).

SUMMARY OF THE INVENTION

Incidentally, in a disk reproduction apparatus having such a configuration as disclosed in Patent Document 1, upon reproduction of recording unit compressed music data, the system controller reads out and acquires also attribute information necessary for a decompression process of compressed music data from the magneto-optical disk. Then, in the disk reproduction apparatus, when recording unit compressed music data read out from the RAM are to be provided to the data decompression circuit, the system controller signals also the attribute information corresponding to the recording unit compressed music data to the data decompression circuit. Consequently, in the disk reproduction apparatus, the data decompression circuit decompresses the recording unit compressed music data precisely using the corresponding attribute information.

However, in the disk reproduction apparatus, the system controller transfers various control instructions to a RAM control circuit, the data decompression circuit and so forth to control temporary storage and reading out processes of the reading unit compressed music data into and from the RAM and a decompression process and other necessary processes for the recording unit compressed music data. Further, in the disk reproduction apparatus, while the system controller discriminates the recording unit compressed music data read out from the RAM, it selects and transfers corresponding attribute information to the data decompression circuit in a timed relationship with the decompression process of the recording unit compressed music data. Therefore, the disk reproduction apparatus is disadvantageous in that, when recording unit compressed music data are to be reproduced, the system controller must transfer a great number of control instructions and pieces of attribute information and so forth to the RAM control circuit, data decompression circuit and so forth and must bear a heavy processing load.

In the present invention, it is desirable to provide a data processing circuit which can process data precisely while the processing load to a controlling source is reduced.

In order to attain the desire of the present invention, according to an embodiment of the present invention, there is provided a data processing circuit, including an information detection section configured to detect, from within data read out from a buffer memory and having attribute information, the attribute information, a data processing section configured to process, in response to the attribute information detected by the information detection section, data corresponding to the attribute information, and a real time control section configured to real time control at least one of the information detection section and the data processing section in accordance with a control instruction for real time processing inputted from the outside.

In the data processing circuit, since attribute information included in data in advance is used for processing of the data, the data can be processed precisely using the corresponding attribute information without causing a controlling source for the data processing circuit to execute such a complicated process that, while it discriminates the data in accordance with the process of the data, it selects and transfer corresponding attribute information. Further, when a request for real time processing is received from the outside, the data processing circuit receives a control instruction for the real time processing transferred from the controlling source at the point of time of the request and real time controls a corresponding element. Therefore, the data processing circuit can cope precisely with a request for real time processing.

According to another embodiment of the present invention, there is provided a data processing apparatus, including a data processing circuit having a buffer memory configured to temporarily store data having attribute information, an information detection section configured to detect the attribute information from the data read out from the buffer memory and having the attribute information, a data processing section configured to process, in response to the attribute information detected by the information detection section, data corresponding to the attribute information, and a real time control section configured to real time control at least one of the information detection section and the data processing section in accordance with a control instruction for real time processing.

In the data processing apparatus, since the data processing circuit detects attribute information included in data in advance and uses the attribute information for processing of the data, the data processing circuit can process the data precisely using the corresponding attribute information without causing a controlling source for the data processing circuit to execute such a complicated process that, while it discriminates the data in accordance with the process of the data, it selects and transfer corresponding attribute information. Further, when a request for real time processing is issued, the data processing apparatus transfers a control instruction for the real time processing transferred from the controlling source at the point of time of the request so as to real time control a corresponding element. Therefore, the data processing apparatus can cope precisely also with a request for real time processing.

According to a further embodiment of the present invention, there is provided a data processing method, including an information detection step of detecting, from within data read out from a buffer memory and having attribute information, the attribute information, a data processing step of processing, in response to the attribute information detected at the information detection step, data corresponding to the attribute information, and a real time control step of real time controlling at least one of the processes executed at the information detection step and the data processing step in accordance with a control instruction for real time processing inputted from the outside.

In the data processing method, since, upon data processing, attribute information included in data in advance is detected and used for processing of the data, the data can be processed precisely using the corresponding attribute information without causing a controlling source for the data processing to execute such a complicated process that, while the data are discriminated in accordance with the process of the data, corresponding attribute information is selected and transferred. Further, in the data processing method, when a request for real time processing is issued from the outside, a control instruction for the real time processing transferred from the controlling source at the point of time of the request is received to real time control a corresponding process. Therefore, it is possible to cope precisely also with a request for real time processing.

According to a still further embodiment of the present invention, there is provided a data processing control method, including a temporarily storing step of signaling, to a data processing circuit including a buffer memory configured to temporarily store data having attribute information, an information detection section configured to detect the attribute information from the data read out from the buffer memory and having the attribute information, a data processing section configured to process, in response to the attribute information detected by the information detection section, data corresponding to the attribute information, and a real time control section configured to real time control at least one of the information detection section and the data processing section in accordance with a control instruction for real time processing, the data having the attribute information so as to be temporarily stored into the buffer memory, and a control instruction signaling step of signaling, when the attribute information is detected from within the data read out from the buffer memory and having the attribute information by the information detection section of the data processing circuit and the data corresponding to the attribute information detected by the information detection section are processed in response to the attribute information by the data processing section, the control instruction for real time processing to the real time control section of the data processing circuit to cause the real time control section of the data processing circuit to perform the real time control of at least one of the information detection section and the data processing section in accordance with the control instruction.

In the data processing control method, since the data processing circuit is controlled to detect attribute information included in data in advance and use the attribute information for processing of the data, the data processing circuit can process the data precisely using the corresponding attribute information without causing a controlling source for the data processing circuit to execute such a complicated process that, while the data are discriminated in accordance with the process of the data, corresponding attribute information is selected and transferred. Further, in the data processing control method, when a request for real time processing is issued, a control instruction for the real time processing is transferred from the controlling source to the data processing circuit at the point of time of the request to real time control a corresponding element. Therefore, it is possible to cope precisely also with a request for real time processing.

According to a yet further embodiment of the present invention, there is provided a storage medium on which a data processing program is recorded, the data processing program causing a data processing circuit to execute an information detection step of detecting, from within data read out from a buffer memory and having attribute information, the attribute information, a data processing step of processing, in response to the attribute information detected at the information detection step, data corresponding to the attribute information, and a real time control step of real time controlling at least one of the processes executed at the information detection step and the data processing step in accordance with a control instruction for real time processing inputted from the outside.

In the data processing program recorded on the storage medium, since the data processing circuit is controlled to detect attribute information included in data in advance and use the attribute information for processing of the data, the data processing circuit can process the data precisely using the corresponding attribute information without causing a controlling source for the data processing circuit to execute such a complicated process that, while the data are discriminated in accordance with the process of the data, corresponding attribute information is selected and transferred. Further, in the data processing program, when a request for real time processing is issued on the outside, the data processing circuit receives a control instruction for the real time processing transferred from the controlling source to the data processing circuit at the point of time of the request to real time control a corresponding element. Therefore, it is possible for the data processing circuit to cope precisely also with a request for real time processing.

According to a yet further embodiment of the present invention, there is provided a storage medium on which a data processing control program is recorded, the data processing control program causing a data processing circuit, which includes a buffer memory configured to temporarily store data having attribute information, an information detection section configured to detect the attribute information from the data read out from the buffer memory and having the attribute information, a data processing section configured to process, in response to the attribute information detected by the information detection section, data corresponding to the attribute information, and a real time control section configured to real time control at least one of the information detection section and the data processing section in accordance with a control instruction for real time processing, to execute a temporarily storing step of signaling the data including the attribute information to the data processing circuit so as to be temporarily stored into the buffer memory, and a control instruction signaling step of signaling, when the attribute information is detected from within the data read out from the buffer memory and having the attribute information by the information detection section of the data processing circuit and the data corresponding to the attribute information detected by the information detection section are processed in response to the attribute information by the data processing section, the control instruction for real time processing to the real time control section of the data processing circuit to cause the real time control section of the data processing circuit to perform the real time control of at least one of the information detection section and the data processing section in accordance with the control instruction.

In the data processing control program recorded on the storage medium, since the data processing circuit is controlled to detect attribute information included in data in advance and use the attribute information for processing of the data, the data processing circuit can process the data precisely using the corresponding attribute information without causing a controlling source for the data processing circuit to execute such a complicated process that, while the data are discriminated in accordance with the process of the data, corresponding attribute information is selected and transferred. Further, in the data processing control program, when a request for real time processing is issued, the data processing apparatus transfers a control instruction for the real time processing transferred from the controlling source to the data processing circuit at the point of time of the request to real time control a corresponding element. Therefore, it is possible for the data processing circuit to cope precisely also with a request for real time processing.

In summary, with the data processing circuit, the data processing method and the storage medium on which the data processing program is stored, from data read out from a buffer memory and including attribute information, the attribute information is detected, and the data in which the attribute information is included are processed in response to the detected attribute information. Then, at least one of the information detection process and the data processing process is real time controlled in accordance with a control instruction for real time processing inputted from the outside. Consequently, the data can be processed precisely using the corresponding attribute information without causing a controlling source for the data processing to execute such a complicated process that, while the data are discriminated in accordance with the process of the data, corresponding attribute information is selected and transferred. Further, also a request for real time processing can be coped with precisely in accordance with a control instruction for real time processing transferred from the controlling source.

Thus, the data can be processed precisely while the processing load to the controlling source is reduced.

Further, with the data processing apparatus, the data processing control method and the storage medium on which the data processing control program is stored, the data processing circuit includes a buffer memory configured to temporarily store data having attribute information, an information detection section configured to detect the attribute information from the data read out from the buffer memory and having the attribute information, a data processing section configured to process, in response to the attribute information detected by the information detection section, data corresponding to the attribute information, and a real time control section configured to real time control at least one of the information detection section and the data processing section in accordance with a control instruction for real time processing. Therefore, the data processing circuit can process the data precisely using the corresponding attribute information without causing a controlling source for the data processing circuit to execute such a complicated process that, while the data are discriminated in accordance with the process of the data, corresponding attribute information is selected and transferred. Further, also a request for real time processing can be coped with precisely by transferring a control instruction for real time processing from the controlling source to the data processing circuit. Thus, the data can be processed precisely while the processing load to the controlling source for the data processing circuit is reduced.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a block diagram showing a circuit configuration of a data processing circuit section shown in FIG. 1;

FIG. 5 is a diagrammatic view illustrating interruption of PIO transfer during DMA transfer in the recording and reproduction apparatus of FIG. 1;

DETAILED DESCRIPTION OF THE PREFERRED EMBODIMENT

Figure 1:
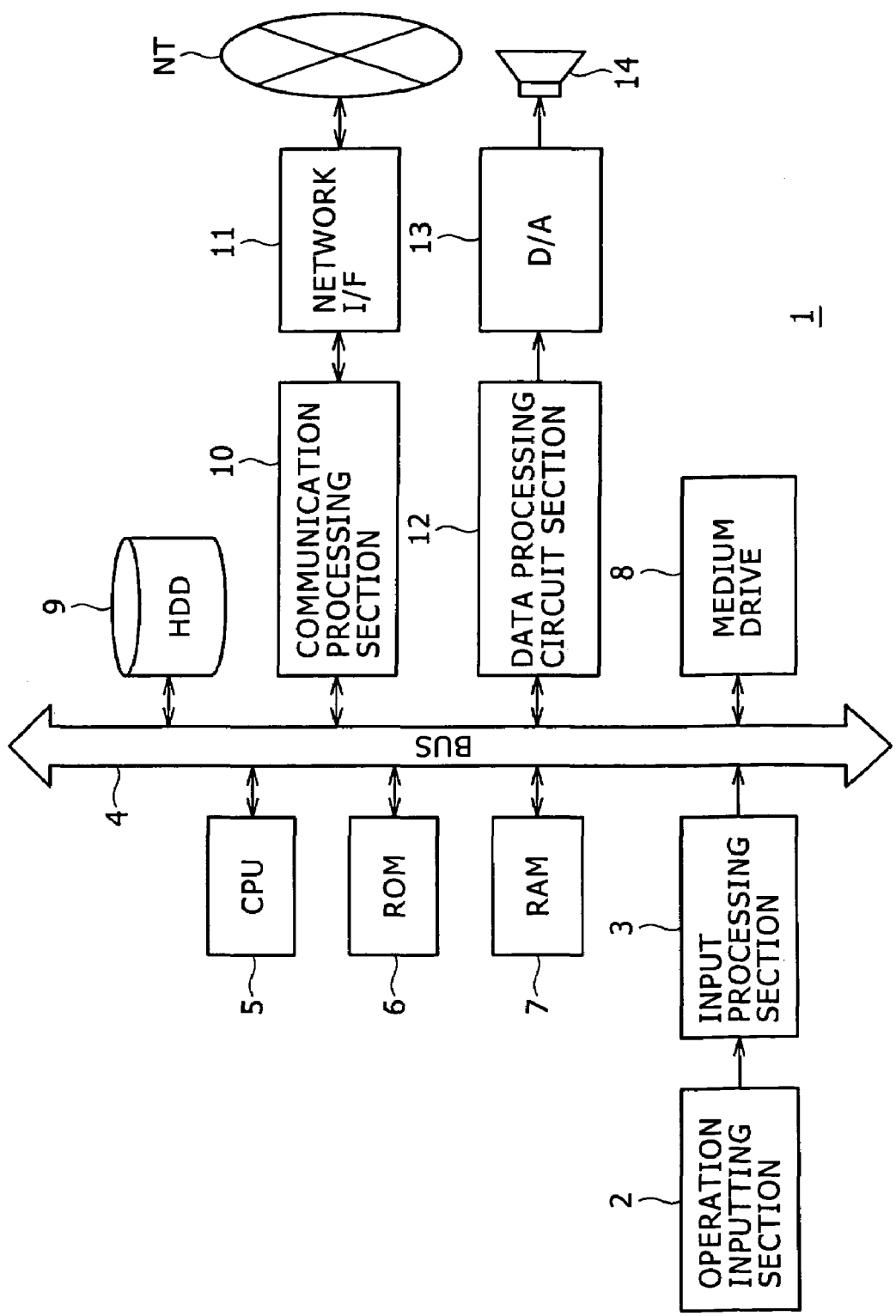
FIG. 1 is a block diagram showing a circuit configuration of a recording and reproduction apparatus to which the present invention is applied.

Referring to FIG. 1, there is shown a recording and reproduction apparatus to which the present invention is applied. The recording and reproduction apparatus is generally denoted by 1 and includes an operation inputting section 2 including various operation buttons provided on the surface of a housing of the recording and reproduction apparatus 1 or a remote controller (not shown). When the operation inputting section 2 is operated by a user, it recognizes the operation and signals a corresponding operation input signal to an input processing section 3. The input processing section 3 performs a predetermined process for the operation input signal supplied thereto to convert the operation input signal into an operation command and supplies the operation command to a CPU (Central Processing Unit) 5 through a bus 4.

The CPU 5 reads out various programs stored in advance in a ROM (Read Only Memory) 6 or a hard disk drive 9 and including a basic program and a data processing control program into a RAM (Random Access Memory) 7 through the bus 4. Then, the CPU 5 controls the overall recording and reproduction apparatus 1 in accordance with the programs and executes a predetermined arithmetic operation process and various processes in accordance with operation commands supplied thereto from the input processing section 3.

A medium drive 8 is configured so as to reproduce a recording medium such as a CD (Compact Disk). In this instance, music data corresponding to a tune are recorded as compressed music data obtained by compression coding the music data on the recording medium. Incidentally, the music data are compression coded in accordance with a compression coding system such as the ATRAC3 (Adaptive Transform Acoustic Coding 3), AAC (Advanced Audio Coding), WMA (Windows Media Audio), RealAUDIO G2 Music Codec, MP3 (MPEG Audio Layer-3) system or the like. Also attribute information to the compressed music data is recorded in a mutually coordinated relationship on the recording medium. Incidentally, the attribute information to the compressed music data includes various kinds of information such as the title and the artist name of a tune, a compression coding system applied to compression coding of the compressed music data, and a bit rate.

The medium drive 8 reads out the compressed music data from the recording medium and successively reads out also the attribute information corresponding to the compressed music data under the control of the CPU 5. Then, the medium drive 8 signals the compressed music data read out from the recording medium to a hard disk drive 9 together with the corresponding attribute information through the bus 4 so that the hard disk drive 9 may record the compressed music data and the attribute information in a coordinated relationship with each other for each tune.

Further, the CPU 5 can establish a connection to a network NT successively through a communication processing section 10 and a network interface 11 to access a tune providing server (not shown) on the network NT. Thus, the CPU 5 fetches the compressed music data and the corresponding attribute information from the tune providing server successively through the network interface 11 and the communication processing section 10. Then, the CPU 5 signals the compressed music data and the corresponding attribute information to the hard disk drive 9 so that the compressed music data and the attribute information are recorded in a coordinated relationship with each other into the hard disk drive 9 for each tune.

Then, the compressed music data and the corresponding attribute information for each tune recorded in the hard disk drive 9 are read out from the hard disk drive 9 in response to an operation input signal for starting reproduction inputted through the operation inputting section 2 by the user and are stored once into the RAM 7 through the bus 4. At this time, the CPU 5 divides the compressed music data on the RAM 7 for each predetermined unit and adds at least part of the attribute information to the compressed music data for each predetermined unit (the data is hereinafter referred to as divisional compressed music data) obtained by the division to produce information-added divisional music data.

Figure 2A:
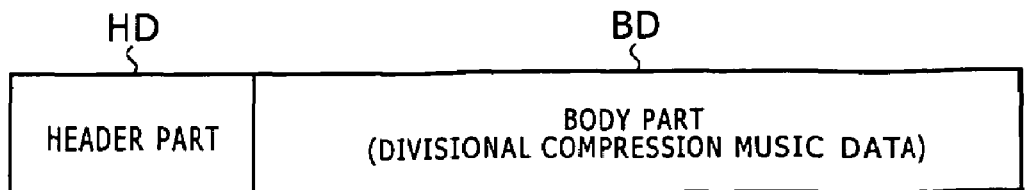
FIGS. 2A and 2B are diagrammatic views illustrating a configuration (1) of information-added divisional music data used in the recording and reproduction apparatus of FIG. 1.
Figure 2B:
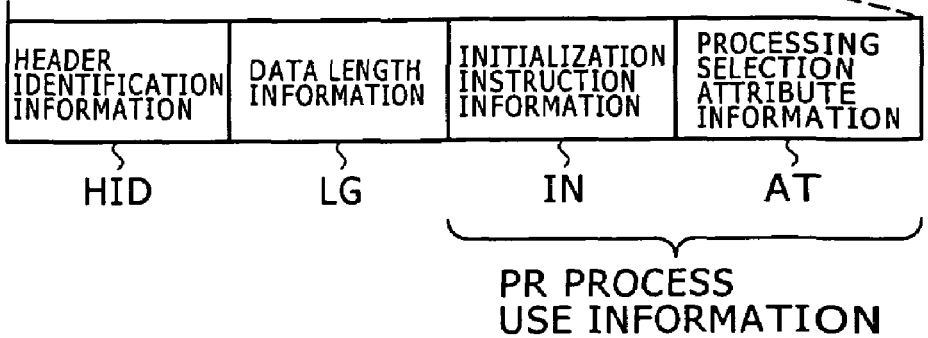
Figure 3A:
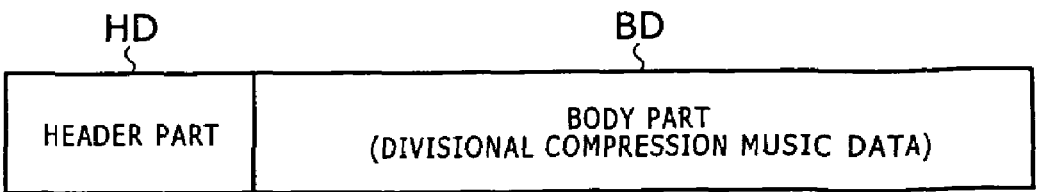
FIGS. 3A and 3B are diagrammatic views illustrating a configuration (2) of the information-added divisional music data used in the recording and reproduction apparatus of FIG. 1.
Figure 3B:
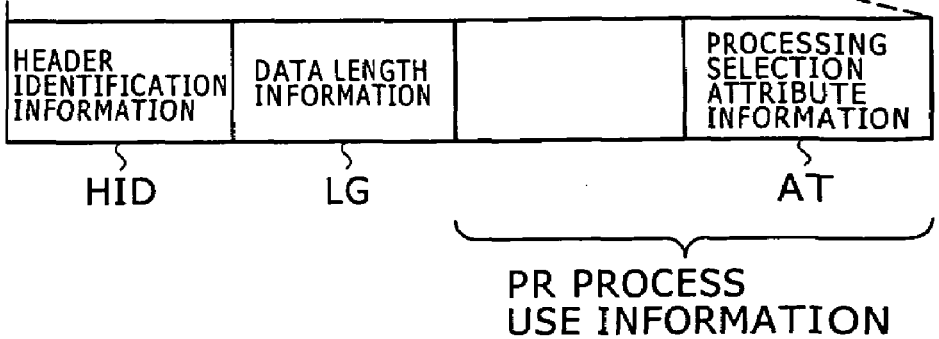

Thereupon, the CPU 5 forms the information-added divisional music data from a header part HD and a body part BD and places one divisional compressed music data into the body part BD as seen in FIG. 2A or 3A. Further, the CPU 5 places header identification information HID for allowing detection of the top of the header part HD of the information-added divisional music data at the top portion of the header part HD as seen in FIG. 2B or 3B. Furthermore, the CPU 5 places, next to the header identification information HID in the header part HD of the information-added divisional music data, data length information LG indicative of the data length of the divisional compressed music data placed in the body part BD and process use information PR necessary for a decompression process of the divisional compressed music data in order. Here, the CPU 5 can place various kinds of information as the process use information PR into the header part HD of the information-added divisional music data. However, the CPU 5 places, for the information-added divisional music data in which the divisional compressed music data at the top of the tune are placed, initialization instruction information IN for initializing a data decompressor, which is hereinafter described, in a data processing circuit section 12 and information (hereinafter referred to as processing selection attribute information) AT selected for a decompression process like a compression coding system and a bit rate in the attribute information corresponding to the divisional compressed music data as the process use information PR (FIG. 2B). Further, for example, for the information-added divisional music data in which the divisional compressed music data at a portion of the tune other than the top from within a plurality of divisional compressed music data for one tune are placed, the CPU 5 places only processing selection attribute information AT corresponding to the divisional compressed music data as the process use information PR (FIG. 3B).

Incidentally, the data decompressor hereinafter described retains, when it performs a decompression process for divisional compressed music data, part of divisional compressed music data for which a decompression process has been performed last. Then, if the divisional compressed music data to be decompressed successively are for one tune, then the data decompressor performs a decompression process for divisional compressed music data of a current object of processing together with part of divisional compressed music data processed last. Consequently, the data decompressor prevents divided portions of data of music for one tune from making noise. Then, according to the present embodiment, when a decompression process is to be performed for the top one of a plurality of divisional compressed music data for one tune, the data decompressor is initialized to erase part of the immediately preceding divisional compressed music data (that is, part of divisional compressed music data at the tail end of one tune for which a decompression process has been performed last) thereby to delimit the tunes definitely from each other. However, according to the present embodiment, it is otherwise possible not to initialize the data decompressor intentionally when the top one of a plurality of divisional compressed music data for one tune is to be processed so that different tunes can be reproduced continuously. Further, according to the present embodiment, it is otherwise possible to initialize the data decompressor every time when a plurality of divisional compressed music data for one tune are successively and intermittently decompressed in accordance with double-speed reproduction so that tune frames based on the divisional compressed music data decompressed intermittently in this manner may be sounded in a definitely delimited manner.

The information-added divisional music data temporarily stored in the RAM 7 are successively transferred to the data processing circuit section 12 through the bus 4. When the data processing circuit section 12 receives the information-added divisional music data successively supplied thereto through the bus 4, it detects the process use information PR placed in the information-added divisional music data. Then, the data processing circuit section 12 performs a reproduction process such as a decompression process using the process use information PR for the divisional compressed music data placed in the information-added divisional music data. As a result, the data processing circuit section 12 supplies the music data successively obtained by the reproduction process performed for the divisional compressed music data (since the music data are part of the entire music data for one tune, such data are hereinafter referred to particularly as divisional unit music data) to a digital to analog converter 13. Consequently, the digital to analog converter 13 performs a digital to analog conversion process for the divisional unit music data and signals a divisional unit music signal obtained by the digital to analog conversion successively to a 2-channel speaker 14. Consequently, the data processing circuit section 12 causes the speaker 14 to output music by stereo based on divisional unit music signals which appear successively and continuously in time.

Referring now to FIG. 4, the data processing circuit section 12 is formed as a circuit board on which IC (Integrated Circuit) chips which form a DMA (Direct Memory Access) controller 18, a buffer memory 19 and a DSP (Digital Signal Processor) 20 are mounted. In this instance, the DSP 20 of the data processing circuit section 12 actually executes a reproduction process including a decompression process for divisional compressed music data in accordance with the data processing program stored in advance in an internal memory thereof. However, in the following description, various functions of the DSP 20 (that is, various functions which can be executed in accordance with the data processing program) are described as processes of functional blocks (that is, a controller 21, an information detector 22, a data decompressor 23 and an equalizer 24) for the convenience of description.

First, if an operation input signal for starting reproduction is inputted through the operation inputting section 2 by the user, then the CPU 5 transfers a data transfer instruction to the DMA controller 18 of the data processing circuit section 12 through the bus 4. As a result, the DMA controller 18 reads out compressed music data and corresponding attribute information, for example, from the hard disk drive 9 without the intervention of the CPU 5 and stores the compressed music data and the attribute information once into the RAM 7 through the bus 4. Further, while the compressed music data and the corresponding attribute information are stored once into the RAM 7 in this manner, the DMA controller 18 successively fetches information-added divisional music data produced from the compressed music data and the corresponding attribute information by the CPU 5 through the bus 4. Then, the DMA controller 18 temporarily and cumulatively stores the information-added divisional music data into the buffer memory 19.

Thereupon, while the CPU 5 successively produces information-added divisional music data from the compressed music data and the corresponding attribute information, it confirms a reading out situation of the information-added divisional music data from the RAM 7. As a result, if the reading out of the information-added divisional music data from the RAM 7 is temporarily interrupted, then the CPU 5 decides that the information-added divisional music data of an amount equal to the capacity of the buffer memory 19 are temporarily stored in the buffer memory 19. When the information-added divisional music data of the amount equal to the capacity of the buffer memory 19 are accumulated in the buffer memory 19 in this manner, the CPU 5 signals a reproduction starting instruction as a control instruction to the controller 21 of the data processing circuit section 12 through the bus 4.

The controller 21 issues a data transfer instruction to the buffer memory 19 in response to the reproduction starting instruction given thereto from the CPU 5 to control so that the temporarily stored information-added divisional music data are read out in order in which they have been stored temporarily. Further, the controller 21 issues an initialization instruction to the information detector 22 to initialize the information detector 22 and then issues an information detection instruction to the information detector 22. Consequently, the information detector 22 fetches, in accordance with the information detection instruction supplied thereto from the controller 21, the information-added divisional music data read out from the buffer memory 19 and specifies and detects the data length information LG and the process use information PR in accordance with the header identification information HID from within the fetched information-added divisional music data. Then, the information detector 22 provides the data length information LG and the process use information PR detected from the header part HD of the information-added divisional music data to the controller 21 and fetches and transfers divisional compressed music data from the body part BD of the information-added divisional music data to the data decompressor 23.

The controller 21 decides whether or not the initialization instruction information IN is included in the process use information PR from between the data length information LG and the process use information PR supplied thereto from the information detector 22. Then, if the initialization instruction information IN is included in the process use information PR, then the controller 21 provides an initialization instruction to the data decompressor 23 and then provides the processing selection attribute information AT included in the process use information PR to the data decompressor 23. On the other hand, if the initialization instruction information IN is not included in the process use information PR, then the controller 21 provides only the processing selection attribute information AT included in the process use information PR to the data decompressor 23.

When an initialization instruction is received from the controller 21, the data decompressor 23 performs an initialization action for a decompression process in accordance with the initialization instruction. Then, after the initialization action comes to an end, the data decompressor 23 fetches divisional compressed music data from the information detector 22 and fetches the processing selection attribute information AT from the controller 21. Consequently, the data decompressor 23 uses the processing selection attribute information AT to decompress the divisional compressed music data to produce divisional unit music data. Further, the data decompressor 23 detects the data length of the divisional compressed music data currently used actually for the production of the divisional unit music data then and notifies the controller 21 of a result of the detection. Further, if only the processing selection attribute information AT is received while an initialization instruction is not received from the controller 21, then the data decompressor 23 does not particularly perform an initialization action for a decompression process but uses the processing selection attribute information AT to decompress the divisional compressed music data supplied thereto from the information detector 22 to produce divisional unit music data. Then, the data decompressor 23 detects the data length of the divisional compressed music data actually used for the production of the divisional unit music data then and notifies the controller 21 of a result of the detection.

At this time, the controller 21 compares the data length received from the data decompressor 23 with the data length indicated by the data length information LG detected by the information detector 22. Then, the controller 21 decides based on a result of the detection whether or not the divisional compressed music data are in a state decompressed correctly by the data decompressor 23. If the two data lengths coincide with each other, then the controller 21 decides that the divisional compressed music data are decompressed correctly by the data decompressor 23. Then, the controller 21 controls the data decompressor 23 to transfer the divisional unit music data produced then to the equalizer 24 at the next stage. Further, the controller 21 issues an initialization instruction to the information detector 22 again to initialize the information detector 22. On the other hand, if the two data lengths do not coincide with each other, then the controller 21 decides that the divisional compressed music data are not in a state decompressed correctly by the data decompressor 23. In this instance, the controller 21 controls the information detector 22, data decompressor 23 and equalizer 24 to interrupt the reproduction process and stores the fact that the divisional compressed music data are not decompressed correctly so that the fact can be detected from the CPU 5. When the divisional compressed music data are decompressed correctly by the data decompressor 23 in such a manner as described above, the controller 21 controls the buffer memory 19, information detector 22 and data decompressor 23 similarly to execute a process for the information-added divisional music data.

Incidentally, the CPU 5 does not transfer the process use information PR necessary for the decompression process of divisional compressed music data to the data processing circuit section 12 separately from the divisional compressed music data but transfers the process use information PR as the information-added divisional music data together with the divisional compressed music data prior to the decompression process of the divisional compressed music data to the data processing circuit section 12 as described hereinabove. However, upon such a reproduction process for divisional compressed music data as described above, if an operation input signal for sound quality adjustment is inputted through the operation inputting section 2 by the user to make a request for adjustment of the sound quality of music in accordance with the liking of the user, then the CPU 5 transfers a sound quality adjustment instruction as a control instruction for a process (hereinafter referred to as real time process) for coping with the request on the real time basis to the controller 21 of the data processing circuit section 12 through the bus 4.

Accordingly, if the controller 21 of the data processing circuit section 12 receives a sound quality adjustment instruction from the CPU 5 upon reproduction processing for divisional compressed music data, then the controller 21 issues a sound quality adjustment command in accordance with the sound quality adjustment instruction to the equalizer 24 to real time control the equalizer 24. On the other hand, if a sound quality adjustment instruction is not received from the CPU 5 upon reproduction processing for divisional compressed music data, then the controller 21 does not particularly issue a sound quality adjustment command to the equalizer 24. Consequently, if a sound quality adjustment instruction is received from the controller 21 when divisional unit music data is received from the data decompressor 23, then the equalizer 24 adjusts predetermined frequency components of the divisional unit music data in accordance with the sound quality adjustment instruction and transfers resulting divisional unit music data to the digital to analog converter 13. On the other hand, if a sound quality adjustment instruction is not received when divisional unit music data is received from the data decompressor 23, then the equalizer 24 adjusts frequency components selected in advance in accordance with a setting therefor and transfers resulting divisional unit music data to the digital to analog converter 13. In this manner, although the equalizer 24 normally adjusts the sound quality of music based on divisional unit music data successively given thereto from the data decompressor 23 in accordance with the setting, if an instruction to adjust the sound quality in a different manner from the setting is received from the user, then the equalizer 24 adjusts the sound quality of the music based on the divisional unit music data on the real time basis in accordance with the adjustment instruction so as to conform to the liking of the user.

It is to be noted that, in the present embodiment, while the controller 21 of the data processing circuit section 12 decompresses divisional compressed music data for one tune, it successively adds the data length indicated by the data length information LG detected by the information detector 22. Then, for example, if a data length returning instruction as a control instruction is received periodically from the CPU 5, then the controller 21 returns the total value (hereinafter referred to as total data length) of the data length obtained by the addition till the point of time to the CPU 5. Consequently, the CPU 5 detects the reproduction position for the compressed music data based on the total data length received from the controller 21 and controls, for example, a display unit not shown to display a result of the detection as time information to notify the user of the result of the detection.

Incidentally, if it is assumed that the internal configuration of the recording and reproduction apparatus includes only hardware logics without using software, then since divisional compressed music data and so forth are processed in order in synchronism between the hardware logics in accordance with various control instructions, no problem particularly occurs with the operation efficiency. In contrast, the recording and reproduction apparatus 1 according to the present embodiment is configured by a combination of software and hardware logics and the CPU 5 operates in accordance with the basic program. Then, in the recording and reproduction apparatus 1, the CPU 5 sets a unit time period (hereinafter referred to as task) for executing each of various processes in accordance with the basic program and successively changes over the task to execute a process allocated to the task. Therefore, in the recording and reproduction apparatus 1, the CPU 5 operates asynchronously with the data processing circuit section 12, hard disk drive 9 and so forth.

Meanwhile, as regards music data (non-compressed music data), the data amount per a reproduction time period of 1 minute is, for example, approximately 10.6 Mbyte where the sampling frequency is 44,100 Hz and the music data are 16-bit stereo data. Therefore, if such music data are compression coded, for example, approximately at 128 Kbps, then the amount of resulting compressed music data for a reproduction time period of 1 minute is approximately 1 Mbyte. Meanwhile, the RAM 7 of the recording and reproduction apparatus 1 is set such that the temporary storage area used for temporary storage of information-added divisional music data is selected, for example, to a capacity of approximately several tens Kbyte. Further, in the recording and reproduction apparatus 1, the capacity of the buffer memory 19 of the data processing circuit section 12 is selected, for example, to approximately several hundreds Kbyte to several Mbyte. Accordingly, in the recording and reproduction apparatus 1, although information-added divisional music data produced by the CPU 5 are temporarily stored in the RAM 7, the reproduction process for the divisional compressed music data placed in the information-added divisional music data is started in a state wherein such information-added divisional music data are accumulated by an amount greater than the capacity of the temporary storage area of the RAM 7 in the buffer memory 19 of the data processing circuit section 12.

In addition, in the recording and reproduction apparatus 1, not the CPU 5 transfers compressed music data and corresponding attribute information or information-added divisional music data from the hard disk drive 9 to the buffer memory 19 of the data processing circuit section 12 through the RAM 7, but the CPU 5 transfers a data transfer instruction to the DMA controller 18 only in a task for a data transfer process. Consequently, in the recording and reproduction apparatus 1, the DMA controller 18 DMA transfers such compressed music data and corresponding attribute information or information-added divisional music data as described above without the intervention of the CPU 5. Therefore, in the recording and reproduction apparatus 1, even if the CPU 5 operates asynchronously with the data processing circuit section 12, hard disk drive 9 and so forth, such a situation that the buffer memory 19 becomes empty and the music outputted from the speaker is interrupted during a reproduction process of divisional compressed music data is prevented.

Further, the CPU 5 transfers a reproduction starting instruction, a sound quality adjustment instruction and so forth as control instructions directly to the controller 21 without the intervention of the DMA controller 18 by PIO (Program Input/Output) transfer. Actually, as seen in FIG. 5, when a data transfer instruction is received from the CPU 5, the DMA controller 18 arbitrates the use right of the bus 4 with the CPU 5 and DMA transfers compressed music data and corresponding attribute information or information-added divisional music data through the bus 4 while occupation of the bus 4 is permitted for the data transfer from the DMA controller 18. If the CPU 5 issues a control instruction in this state, then the CPU 5 interrupts the DMA transfer being currently performed by the DMA controller 18 to acquire the use right of the bus 4. Consequently, the CPU 5 now PIO transfers the control instruction to the controller 21 of the data processing circuit section 12 through the bus 4. Then, when the PIO transfer of the control command is completed, the CPU 5 gives the use right of the bus 4 back to the DMA controller 18 and re-starts the DMA transfer.

In this manner, although the CPU 5 DMA transfers the process use information PR as information-added divisional music data together with divisional compressed music data to the data processing circuit section 12, it PIO transfers a control instruction. Accordingly, the CPU 5 can control the reproduction process of the data processing circuit section 12 precisely.

Figure 6:
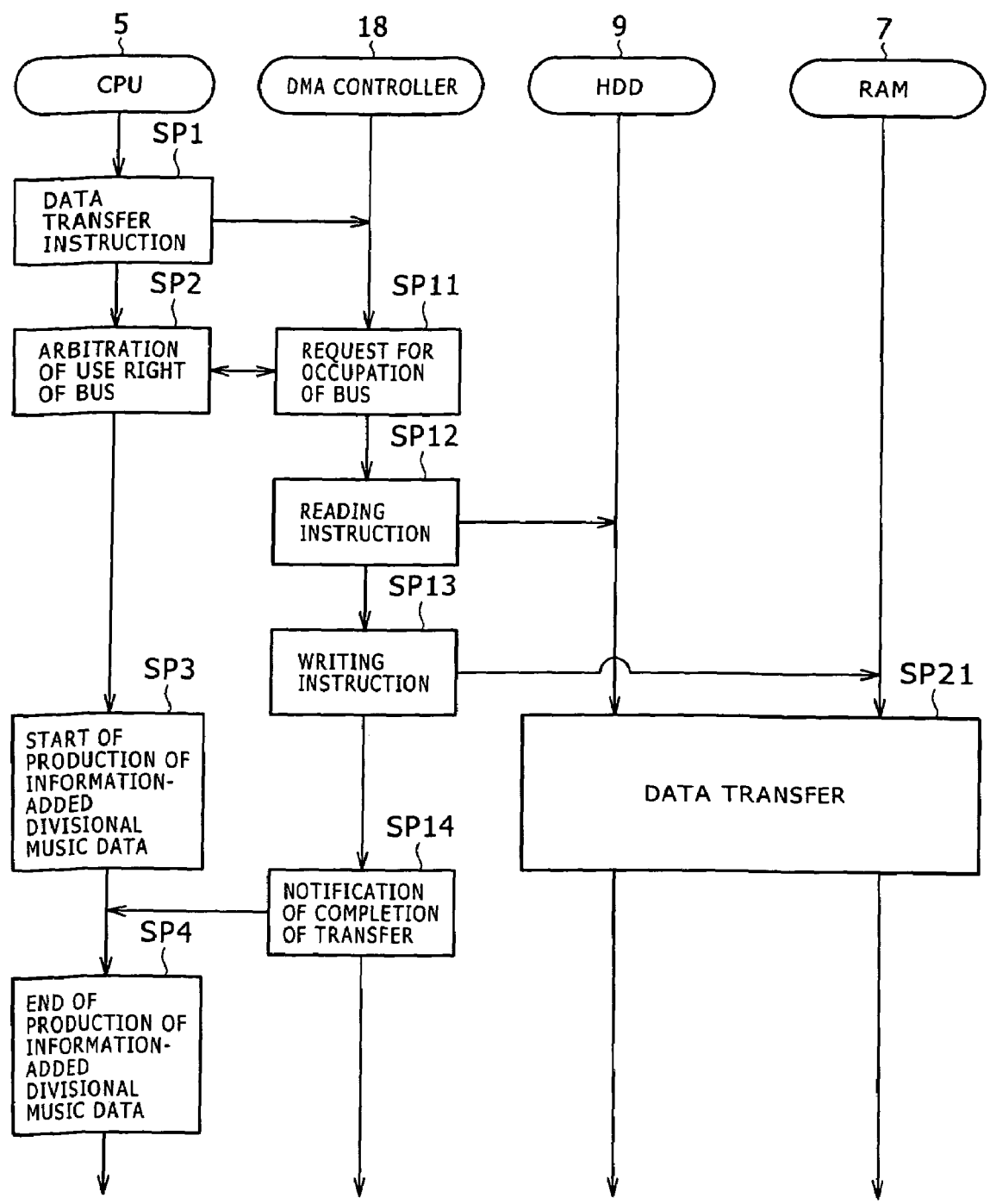
FIG. 6 is a sequence chart illustrating a first data transfer processing sequence in the recording and reproduction apparatus of FIG. 1.

Now, processes of the CPU 5 and the data processing circuit section 12 are described in detail with reference to sequence charts of FIGS. 6 to 10. FIG. 6 illustrates a first data transfer process sequence. Referring to FIG. 6, if an operation input signal to start reproduction is inputted by an operation of the operation inputting section 2 by the user, then the CPU 5 starts a data production processing procedure in accordance with the data processing control program stored in the ROM 6. After the data production processing procedure is started, the CPU 5 transfers a first data transfer instruction to the DMA controller 18 through the bus 4 at step SP1, whereafter the processing advances to step SP2.

At this time, the DMA controller 18 fetches the first data transfer instruction transferred from the CPU 5 to start a first data transfer processing procedure. After the first data transfer processing procedure is started, the DMA controller 18 issues a request to the CPU 5 to permit occupation of the bus 4 for data transfer between the hard disk drive 9 and the RAM 7 at step SP11. In response to the request, the CPU 5 arbitrates the use right of the bus 4 with the DMA controller 18 at step SP2. Then, if the DMA controller 18 is permitted by the CPU 5 to occupy the bus 4 for data transfer between the hard disk drive 9 and the RAM 7, then the DMA controller 18 occupies the bus 4 for data transfer between the hard disk drive 9 and the RAM 7. In this state, the DMA controller 18 advances the processing to step SP12.

At step SP12, the DMA controller 18 transfers a reading instruction to read out compressed music data and corresponding attribute information to the hard disk drive 9, whereafter the DMA controller 18 advances the processing to step SP13. At step SP13, the DMA controller 18 transfers a writing instruction of compressed music data and corresponding attribute information to the RAM 7, whereafter it advances the processing to step SP14. Consequently, the DMA controller 18 reads out the compressed music data and the corresponding attribute information from the hard disk drive 9 and DMA transfers the read out compressed music data and corresponding attribute information to the RAM 7 through the bus 4 so as to be stored once into the RAM 7 at step SP21. When the compressed music data and the corresponding attribute information begin to be stored into the RAM 7, the CPU 5 begins, at step SP3, to produce information-added divisional music data such that, to the compressed music data stored once in the RAM 7, at least one of the corresponding attribute information is added. Thereafter, the CPU 5 advances the processing to step SP4.

When the DMA transfer of the compressed music data together with the attribution information from the hard disk drive 9 to the RAM 7 is completed in this manner, the DMA controller 18 notifies the CPU 5 of the completion of transfer at step SP14. Consequently, the DMA controller 18 abandons the use right of the bus 4, which has been occupied for data transfer between the hard disk drive 9 and the RAM 7, once. Then, the CPU 5 successively produces information-added divisional music data concurrently with the transfer of compressed music data and corresponding attribute information to the RAM 7. As a result, when the transfer of the compressed music data and the corresponding attribute information to the RAM 7 is completed and information-added divisional music data for the entire compressed music data are produced on the RAM 7 at step SP4, the CPU 5 ends the production of information-added divisional music data. In this manner, the CPU 5 and the DMA controller 18 execute the processes at steps SP1-SP2-SP3-SP4-SP11-SP12-SP13-SP14-SP21 successively and repetitively until after transfer of compressed music data for a predetermined number of tunes whose reproduction is requested by the user is completed.

Figure 7:
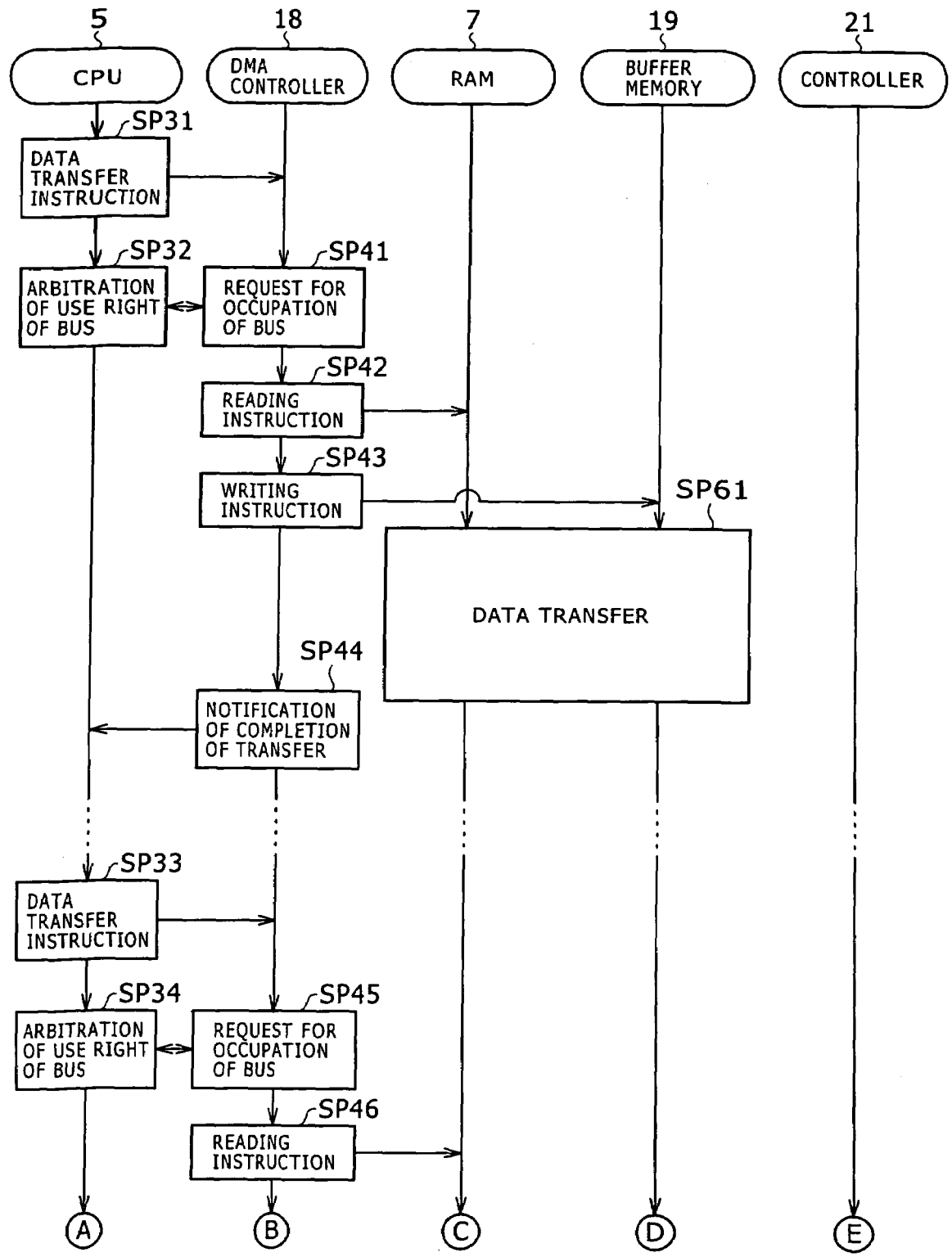
FIG. 7 is a sequence chart illustrating a second data transfer processing sequence (1) in the recording and reproduction apparatus of FIG. 1.
Figure 8:
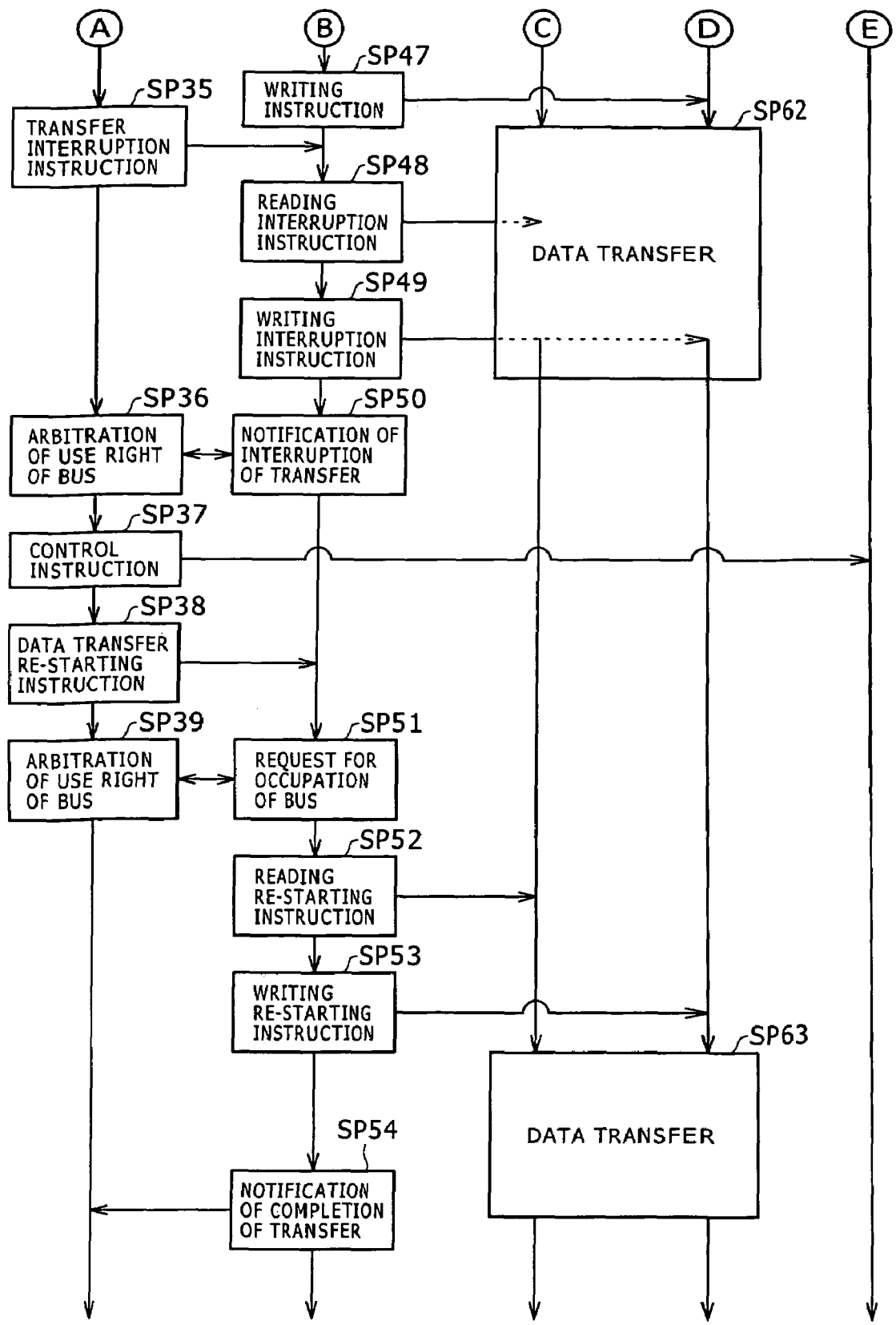
FIG. 8 is a sequence chart illustrating a second data transfer processing sequence (2) in the recording and reproduction apparatus of FIG. 1.

FIGS. 7 and 8 illustrate a second data transfer processing sequence executed concurrently with the first data transfer processing sequence. Referring first to FIG. 7, when the operation input signal to start reproduction is inputted in response to the operation of the operation inputting section 2 by the user, the CPU 5 starts also a data processing control processing procedure in accordance with the data processing control program stored in the ROM 6. After the data processing control processing procedure is started, the CPU 5 transfers a second data transfer instruction to the DMA controller 18 through the bus 4 at step SP31, and then advances the processing to step SP32.

At this time, the DMA controller 18 fetches the second data transfer instruction transferred thereto from the CPU 5 to start the second data transfer processing procedure. After the second data transfer processing procedure is started, the DMA controller 18 issues a request to the CPU 5 to permit occupation of the bus 4 for data transfer between the RAM 7 and the buffer memory 19 at step SP41. In response to the request, the CPU 5 arbitrates the use right of the bus 4 with the DMA controller 18 at step SP32. Then, if the occupation of the bus 4 for data transfer between the RAM 7 and the buffer memory 19 by the DMA controller 18 is permitted by the CPU 5, then the DMA controller 18 occupies the bus 4 for data transfer between the RAM 7 and the buffer memory 19, and in this state, the DMA controller 18 advances the processing to step SP42.

At step SP42, the DMA controller 18 transfers a reading instruction of information-added divisional music data to the RAM 7, whereafter the DMA controller 18 advances the processing to step SP43. At step SP43, the DMA controller 18 transfers a writing information of information-added divisional music data to the buffer memory 19, whereafter it advances the processing to step SP44. In response to the request, the DMA controller 18 reads out, at step SP61, the information-added divisional music data from the RAM 7 and DMA transfers the read out information-added divisional music data to the buffer memory 19 through the bus 4 so as to be temporarily and cumulatively stored into the buffer memory 19. After the DMA transfer of the information-added divisional music data from the RAM 7 to the buffer memory 19 is completed, the DMA controller 18 notifies the CPU 5 of the completion of transfer at step SP44. Consequently, the DMA controller 18 temporarily abandons the use right of the bus 4 which has been occupied thereby for data transfer between the RAM 7 and the buffer memory 19.

Then at step SP33, the CPU 5 transfers a second data transfer instruction to the DMA controller 18 through the bus 4 again, whereafter it advances the processing to step SP34. At this time, the DMA controller 18 fetches the second data transfer instruction transferred thereto from the CPU 5 and then advances the processing to step SP45, at which it issues a request to the CPU 5 to permit occupation of the bus 4 for data transfer between the RAM 7 and the buffer memory 19 again. In response to the request, the CPU 5 arbitrates the use right of the bus 4 with the DMA controller 18 at step SP34. Then, if the occupation of the bus 4 for data transfer between the RAM 7 and the buffer memory 19 is permitted by the CPU 5, then the DMA controller 18 occupies the bus 4 for data transfer between the RAM 7 and the buffer memory 19, and in this state, the DMA controller 18 advances the processing to step SP46.

At step SP46, the DMA controller 18 transfers a reading instruction of information-added divisional music data to the RAM 7, whereafter it advances the processing to step SP47 of FIG. 7. Referring to FIG. 7, at step SP47, the DMA controller 18 transfers a writing instruction of information-added divisional music data to the buffer memory 19, whereafter it advances to step SP48. The DMA controller 18 reads out information-added divisional music data from the RAM 7 at step SP62 and DMA transfers the read out information-added divisional music data to the buffer memory 19 through the bus 4 so as to be temporarily and cumulatively stored into the buffer memory 19.

Incidentally, if the CPU 5 decides, because the information-added divisional music data are accumulated by an amount equal to the capacity of the buffer memory 19 into the buffer memory 19 while the information-added divisional music data are DMA transferred between the RAM 7 and the buffer memory 19, that a reproduction starting instruction should be PIO transferred to the data processing circuit section 12 or if the CPU 5 decides, because an operation input signal for sound adjustment is inputted by an operation of the operation inputting section 2 by the user, that a sound quality instruction for real time processing should be PIO transferred, then the CPU 5 transfers a transfer interruption instruction for temporarily interrupting the data transfer to the DMA controller 18 through the bus 4 at step SP35. Thereafter, the CPU 5 advances the processing to next step SP36.

At this time, the DMA controller 18 fetches the transfer interruption instruction transferred thereto from the CPU 5 and advances the processing to step SP48, at which the DMA controller 18 transfers a reading interruption instruction of information-added divisional music data to the buffer memory 19. Thereafter, the DMA controller 18 advances the processing to step SP49, at which the DMA controller 18 transfers a writing instruction of information-added divisional music data to the buffer memory 19, whereafter the processing advances to step SP50. Consequently, the DMA controller 18 interrupts the DMA transfer of information-added divisional music data from the RAM 7 to the buffer memory 19. Then, at step SP50, the DMA controller 18 notifies the CPU 5 of the interruption of the transfer thereby to abandon the use right of the bus 4, which has been occupied for data transfer between the RAM 7 and the buffer memory 19, once. In response to the notification, the CPU 5 arbitrates the use right of the bus 4 with the DMA controller 18 at step SP36. Then, after the CPU 5 occupies the bus 4 for instruction transfer between the RAM 7 and the buffer memory 19, it advances the processing to step SP37.

At step SP37, the CPU 5 PIO transfers a control instruction such as a reproduction starting instruction or a sound quality adjustment instruction to the controller 21 of the data processing circuit section 12 through the bus 4, whereafter the CPU 5 advances the processing to step SP38. Then at step SP38, the CPU 5 transfers a data transfer re-starting instruction to the DMA controller 18 through the bus 4, whereafter the CPU 5 advances the processing to step SP39. At this time, the DMA controller 18 fetches the data transfer re-starting instruction transferred thereto from the CPU 5 and advances the processing to step SP51, at which the DMA controller 18 issues a request to the CPU 5 to permit occupation of the bus 4 for data transfer between the RAM 7 and the buffer memory 19 again. In response to the request, the CPU 5 arbitrates the use right of the bus 4 with the DMA controller 18 at step SP39. Then, when the CPU 5 permits occupation of the bus 4 between the RAM 7 and the buffer memory 19, the DMA controller 18 occupies the bus 4 for data transfer between the RAM 7 and the buffer memory 19 and advances the processing to step SP52 in this state.

At step SP52, the DMA controller 18 transfers a reading re-starting instruction of information-added divisional music data to the RAM 7, whereafter the DMA controller 18 advances the processing to step SP53. At step SP53, the DMA controller 18 transfers a writing re-starting instruction of information-added divisional music data to the buffer memory 19, whereafter the DMA controller 18 advances the processing to step SP54. Consequently, the DMA controller 18 reads out the information-added divisional music data from the RAM 7 again and DMA transfers the read out information-added divisional music data to the buffer memory 19 through the bus 4 so as to be temporarily and cumulatively stored into the buffer memory 19 at step SP63. After the DMA transfer of the information-added divisional music data from the RAM 7 to the buffer memory 19 is completed including the information-added divisional music data prior to the interruption of the data transfer, the DMA controller 18 notifies the CPU 5 of the completion of transfer at step SP54. Consequently, the DMA controller 18 abandons the use right of the bus 4, which has been occupied for data transfer between the RAM 7 and the buffer memory 19, once. Then, the CPU 5 and the DMA controller 18 execute the processes at steps SP31-SP32-SP41-SP42-SP43-SP44-SP61 successively and repetitively until after PIO transfer of a control instruction becomes necessary. Further, when a control instruction is to be PIO transferred, the CPU 5 and the DMA controller 18 suitably execute the processes at steps SP33-SP34-SP35-SP36-SP37-SP38-SP39-SP45-SP46-SP47-SP48-SP49-SP50-SP51-SP52-SP53-SP54-SP62-SP63.

Figure 9:
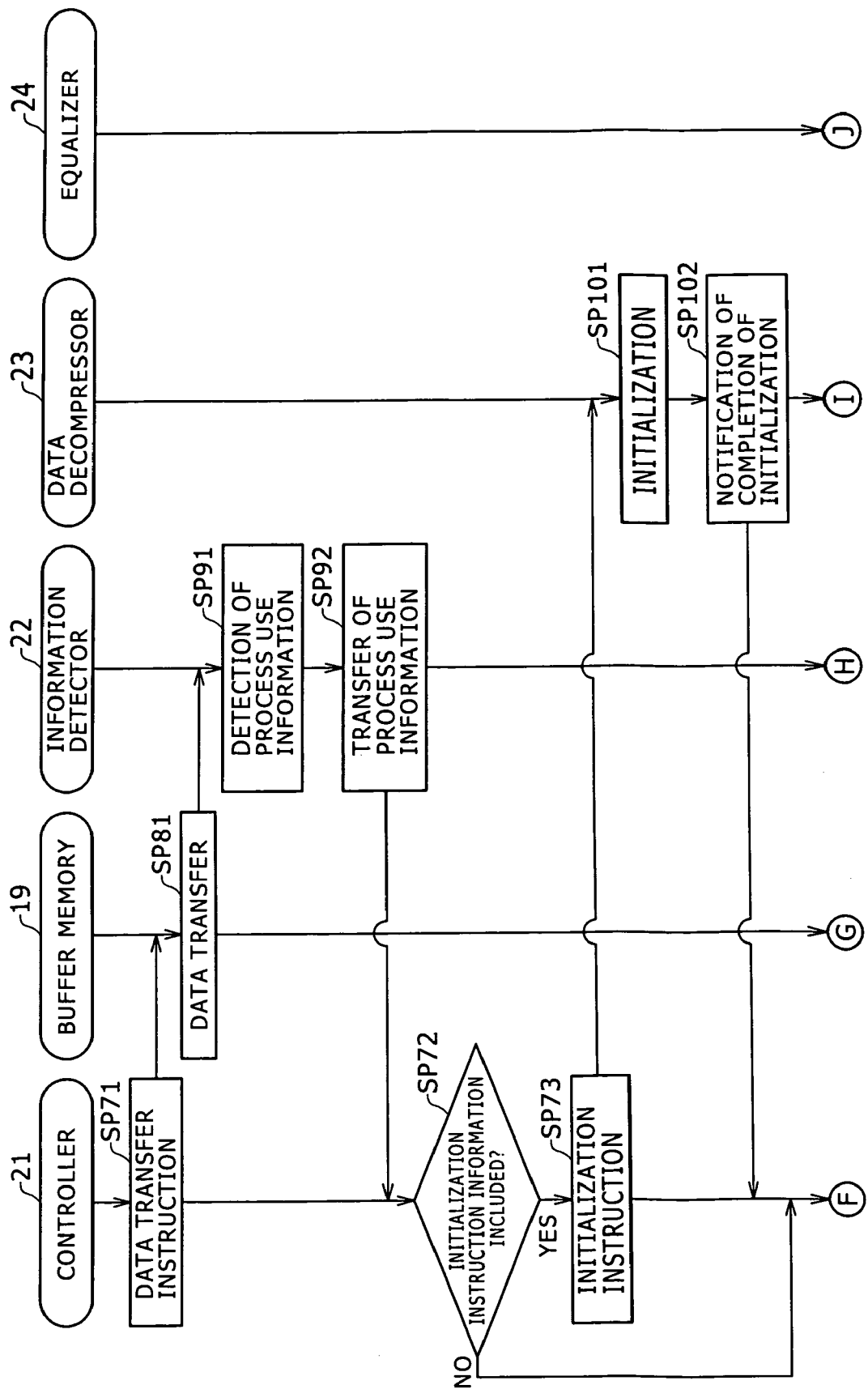
FIG. 9 is a sequence chart illustrating a data processing sequence (1) in the recording and reproduction apparatus of FIG. 1.
Figure 10:
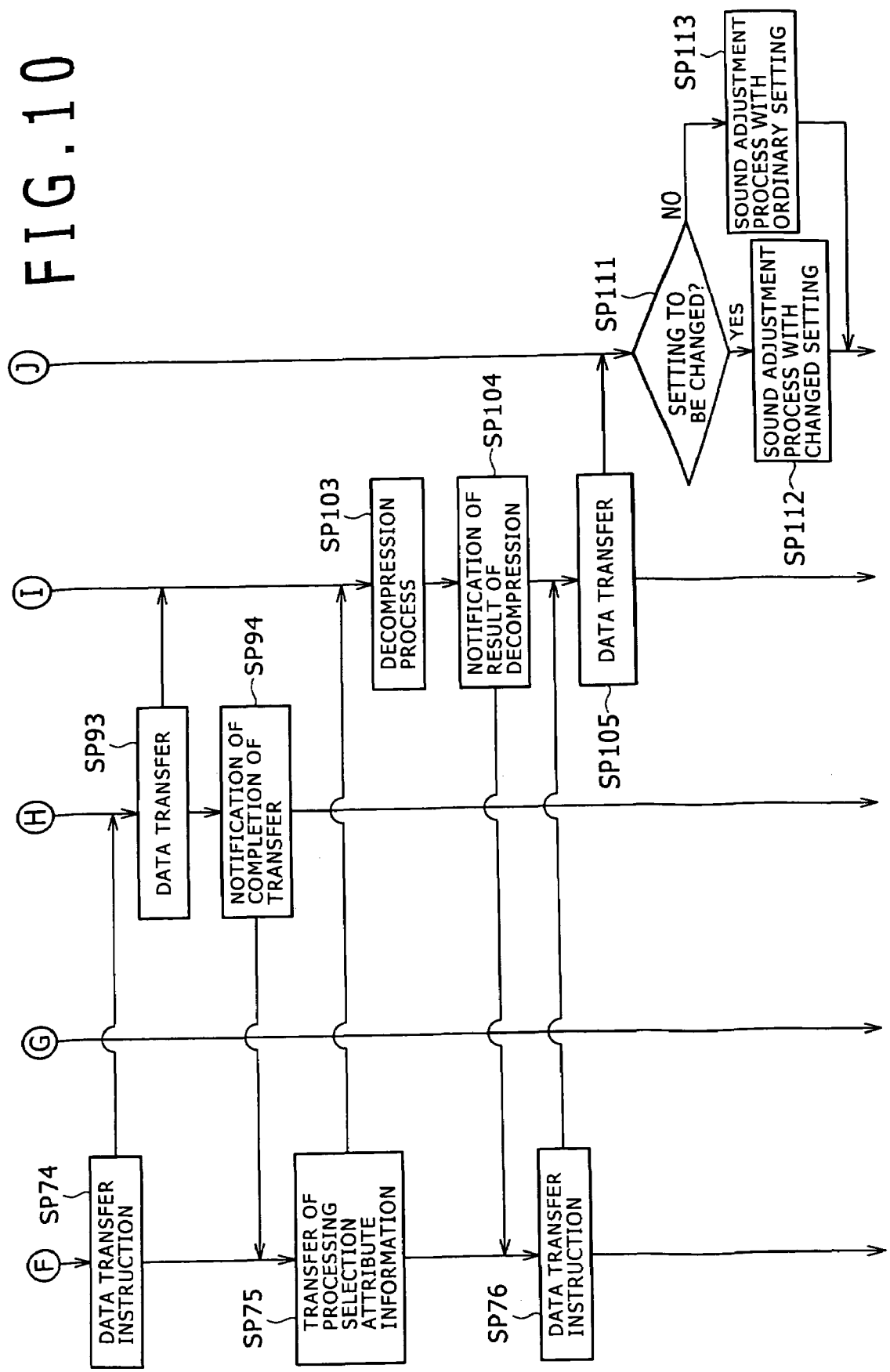
FIG. 10 is a sequence chart illustrating a data processing sequence (2) in the recording and reproduction apparatus of FIG. 1.

The DSP 20 of the data processing circuit section 12 executes a data processing sequence illustrated in FIGS. 9 and 10 in accordance with the data processing program stored in advance in the internal memory thereof concurrently to the first and second data transfer processing sequences. However, in the following description, the data processing sequence executed by the DSP 20 is described as processes of the controller 21, information detector 22, data decompressor 23 and equalizer 24 which are functional blocks. Further, after the controller 21 in the data processing circuit section 12 fetches the reproduction starting instruction PIO transferred from the CPU 5, it starts a circuit control processing procedure. Then, after the controller 21 starts the circuit control processing procedure, it transfers the data transfer instruction information to the buffer memory 19 at step SP71, whereafter the controller 21 advances the processing to step SP72. Consequently, the buffer memory 19 transfers, at step SP81, that one of the temporarily and cumulatively stored information-added divisional music data which was temporarily accumulated earliest to the information detector 22 in accordance with the data transfer instruction information given thereto from the controller 21.

At this time, the information detector 22 fetches the information-added divisional music data transferred thereto from the buffer memory 19 and starts the information detection processing procedure. After the information detection processing procedure is started, the information detector 22 detects the process use information PR together with the data length information LG from the header part HD of the information-added divisional music data at step SP91, whereafter the information detector 22 advances the processing to step SP92. Then at step SP92, the information detector 22 transfers the data length information LG and the process use information PR detected from the information-added divisional music data to the controller 21, whereafter the information detector 22 advances the processing to step SP93.

Accordingly, at step SP72, the controller 21 fetches the data length information LG and the process use information PR transferred thereto from the information detector 22 and decides whether or not the initialization instruction information IN is included in the fetched process use information PR. If an affirmative result is obtained at step SP72, then this represents that divisional compressed music data which is an object of the decompression process at this point of time (that is, divisional compressed music data stored in the information-added divisional music data transferred from the buffer memory 19 to the information detector 22 at this time) is divisional compressed music data at the top of a new tune. In other words, such an affirmative result as described above represents that it is requested to decompress the compressed divisional music data which is an object of the decompression process at the present point of time without using part of the compressed music data which has been decompressed last. Accordingly, the controller 21 advances the processing at this time to step SP73. Then, at step SP73, the controller 21 transfers the initialization instruction information IN to the data decompressor 23, whereafter it advances the processing to step SP74.

At this time, the data decompressor 23 fetches the initialization instruction information IN transferred thereto from the controller 21 and starts the data decompression processing procedure. After the data decompression processing procedure is started, the data decompressor 23 performs self initialization action at step S101 to delete all of the part of the divisional compressed music data having remained as a result of the latest decompression process. Then, after the initialization is completed, the processing advances to step SP102. Then, at step SP102, the data decompressor 23 notifies the controller 21 of the completion of initialization, whereafter the data decompressor 23 advances the processing to step SP103.

Consequently, the controller 21 transfers, at step S74, data transfer instruction information to the information detector 22 in response to the notification of completion of initialization from the controller 21, whereafter controller 21 advances the processing to step SP75. Consequently, at step SP93, the information detector 22 transfers divisional compressed music data placed in the information-added divisional music data to the data decompressor 23 in response to the data transfer instruction information transferred thereto from the controller 21. After the transfer is completed, the processing is advanced to step SP94. Then at step SP94, the information detector 22 notifies the controller 21 that the transfer of the divisional compressed music data is completed. Consequently, the controller 21 transfers, at step SP75, the data decompression instruction information to the data decompressor 23 together with the processing selection attribute information AT included in the process use information PR in response to the completion of transfer whose notification is received from the information detector 22. Thereafter, the processing advances to step SP76.

At this time, the data decompressor 23 decompresses the divisional compressed music data using the corresponding processing selection attribute information AT in accordance with the data decompression instruction information transferred thereto from the controller 21 at step SP103. After the decompression process is completed, the data decompressor 23 advances the processing to step SP104. At step SP104, the data decompressor 23 notifies the controller 21 of the data length of the decompressed divisional compressed music data, whereafter the data decompressor 23 advances the processing to step SP105. Accordingly, the controller 21 compares, at step SP76, the data length received as a decompression process result from the data decompressor 23 with the data length represented by the data length information LG having been provided to the information detector 22. Then, if the data lengths coincide with each other, then the controller 21 transfers the data transfer instruction information to the data decompressor 23. Consequently, the data decompressor 23 transfers divisional compressed music data obtained by the decompression process of the divisional compressed music data to the equalizer 24 in accordance with the data transfer instruction information transferred from the controller 21 at step SP105.

At this time, the equalizer 24 fetches the divisional compressed music data transferred thereto from the data decompressor 23 and starts a sound quality adjustment processing procedure. After the sound quality adjustment processing procedure is started, the equalizer 24 decides at steps SP111 whether or not it is requested to change the setting for sound quality adjustment. If divisional compressed music data are currently being reproduced on the recording and reproduction apparatus 1, then the user can operate the operation inputting section 2 at an arbitrary point of time to input an operation input signal for sound quality adjustment. Therefore, though not particularly illustrated in FIGS. 9 and 10, while the processes at steps SP71 to SP76 described hereinabove are successively executed by the controller 21, the CPU 5 can fetch the sound quality adjustment instruction for real time processing PIO transferred from the CPU 5 at any timing and can transfer sound quality adjustment instruction information in accordance with the sound quality adjustment instruction to the equalizer 24.

Accordingly, if an affirmative result is obtained at step SP111, then this represents that a request to adjust the music so as to have favorite sound quality is issued from the user and the equalizer 24 fetches the sound quality adjustment instruction information transferred from the controller 21. Accordingly, at this time, the equalizer 24 advances the processing to step SP112. Then, at step SP112, the equalizer 24 changes the setting for sound quality adjustment in accordance with the sound quality adjustment instruction information transferred thereto from the controller 21 and adjusts predetermined frequency components of divisional unit music data in accordance with the substance of the setting. Then, the equalizer 24 transfers the resulting divisional unit music data to the digital to analog converter 13.

On the other hand, if a negative result is obtained at step SP111 described hereinabove, then since this represents that a particular request to adjust the sound quality is not received from the user, this indicates that the equalizer 24 does not fetch the sound quality adjustment instruction information as yet. Thus, at step SP113, the equalizer 24 performs an adjustment process for the divisional unit music data with regard to the frequency components selected in advance in accordance with the setting and transfers resulting divisional unit music data to the digital to analog converter 13.

Incidentally, that a negative result is obtained at step SP72 described hereinabove represents that the divisional compressed music data of an object the decompression process at the present point of time is divisional compressed music data other than the top of a plurality of divisional compressed music data for one tune. In other words, the negative result represents that it is requested to decompress compressed divisional music data of an object of the decompression process at the present point of time except part of compressed music data which has been decompressed last. Accordingly, the controller 21 advances the processing to step SP74. Consequently, the controller 21 decompresses the divisional compressed music data without initializing the data decompressor 23.

In this manner, the controller 21, information detector 22, data decompressor 23 and equalizer 24 execute the processes at steps SP71-SP72-SP73-SP74-SP75-SP76-SP91-SP92-SP93-SP94-SP101-SP102-SP103-SP104-SP105-SP111-SP112-SP113 described above successively and repetitively to successively reproduce divisional compressed music data accumulated as information-added divisional music data in the buffer memory 19 using the individually corresponding processing selection attribute information AT.

In the recording and reproduction apparatus 1 having the configuration described above, if a request to reproduce compressed music data is received from the user, then the DMA controller 18 receiving a data transfer instruction from the CPU 5 DMA transfers compressed music data and corresponding attribute information successively from the hard disk drive 9 into the buffer memory 19 of the data processing circuit section 12 through the bus 4 so as to be stored once into the RAM 7 and thereupon the CPU 5 produces information-added divisional music data in such a manner that, to the compressed music data, at least part of corresponding attribute information is added on the RAM 7. Further, in the recording and reproduction apparatus 1, while the DMA controller 18 DMA transfers the information-added divisional music data successively from the RAM 7 to the buffer memory 19 of the data processing circuit section 12 through the bus 4 so as to be temporarily stored into the buffer memory 19, the CPU 5 PIO transfers a reproduction re-starting instruction to the controller 21 of the data processing circuit section 12 at a point of time when information-added divisional music data are accumulated by an amount equal to the capacity of the buffer memory 19 in the buffer memory 19.

Consequently, in the recording and reproduction apparatus 1, information-added divisional music data are transferred in order of temporary storage from the buffer memory 19 to the information detector 22 under the control of the controller 21 in the data processing circuit section 12. Then, the information detector 22 detects the process use information PR from the header part HD of the information-added divisional music data and extracts divisional compressed music data from the body part BD of the information-added divisional music data, and transfers the process use information PR and the divisional compressed music data to the data decompressor 23. Further, in the recording and reproduction apparatus 1, the data decompressor 23 performs an initialization action in response the initialization instruction information IN included in the process use information PR under the control of the controller 21 in the data processing circuit section 12 and decompresses the divisional compressed music data using the processing selection attribute information AT includes in the process use information PR. Then, the resulting divisional compressed music data is transferred to the equalizer 24.

Further, in the recording and reproduction apparatus 1, the equalizer 24 performs a sound quality adjustment process for divisional unit music data in accordance with the substance of the setting for sound quality adjustment set in advance under the control of the controller 21 in the data processing circuit section 12. However, in the recording and reproduction apparatus 1, if a request to adjust the sound quality in accordance with the liking of the user is issued from the user during the reproduction process of divisional compressed music data, then the CPU 5 PIO transfers a sound quality adjustment instruction for real time processing to the controller 21 of the data processing circuit section 12 through the bus 4 so that the request may be coped with by real time processing. Consequently, in the recording and reproduction apparatus 1, when a request to adjust the sound quality in accordance with the liking of the user is issued by the user, the data processing circuit section 12 performs a sound quality adjustment process for divisional compressed music data obtained by a decompression process at the point of time in accordance with the substance of the setting for sound quality adjustment according to the sound quality adjustment instruction under the control of the controller 21.

In the recording and reproduction apparatus 1 having the configuration described above, information-added divisional music data produced by adding, to divisional compressed music data, at least part of attribute information are successively read out from the buffer memory 19 in the data processing circuit section 12 and transferred to the information detector 22, and processing selection attribute information AT is detected as process use information PR from the information-added divisional music data by the information detector 22 while the processing selection attribute information AT is used by the data decompressor 23 to decompress divisional compressed music data placed in the information-added divisional music data. Further, in the recording and reproduction apparatus 1, when a request for sound quality adjustment is issued from the user, the CPU 5 immediately transfers a sound quality adjustment instruction as a control instruction for real time processing in accordance with the request. Further, the controller 21 receiving the sound quality adjustment instruction controls the equalizer 24 on the real time bases in accordance with the sound quality adjustment instruction.

Accordingly, in the recording and reproduction apparatus 1, even if the CPU 5 does not select and successively transfer processing selection attribute information AT corresponding to divisional compressed music data to the equalizer 24 while it discriminates the divisional compressed music data in accordance with a decompression process of the divisional compressed music data, the data processing circuit section 12 can detect the processing selection attribute information AT added in advance to the divisional compressed music data and precisely decompress the corresponding divisional compressed music data using the detected processing selection attribute information AT. Further, in the recording and reproduction apparatus 1, although the processing selection attribute information AT to be used for the decompression process of the divisional compressed music data is passed to the data processing circuit section 12 together with the divisional compressed music data in prior to the decompression process for the divisional compressed music data, while it is necessary to cope with a request of the user or the like on the real time basis, a control instruction for real time processing is transferred at the point of time of the request from the CPU 5 to the data processing circuit section 12. Therefore, even a sudden request or the like can be coped with precisely. Therefore, in the recording and reproduction apparatus 1, divisional compressed music data can be processed precisely while the processing load to the CPU 5 which is a controlling source of the data processing circuit section 12 is reduced.

Further, in the recording and reproduction apparatus 1, not only various control instructions but also the process use information PR are not directly transferred to the data processing circuit section 12, but the process use information PR is DMA transferred as information-added divisional music data together with the divisional compressed music data to the data processing circuit section 12 whereas only control instructions are PIO transferred. Accordingly, in the recording and reproduction apparatus 1, while divisional compressed music data (that is, as information-added divisional music data) are transferred to the data processing circuit section 12, interruption of the DMA transfer by the PIO transfer to the data processing circuit section 12 is reduced to the utmost. Consequently, in the recording and reproduction apparatus 1, while information-added divisional music data are accumulated sufficiently into the buffer memory 19, the data processing circuit section 12 can perform a reproduction process of the divisional compressed music data. Consequently, such a situation that music to be outputted from the speaker is interrupted intermediately is prevented almost with certainty.

Then, in the recording and reproduction apparatus 1, even if the number of control instructions to be transferred from the CPU 5 to the data processing circuit section 12 together with the increasing tendency of functions in recent years, also the process use information PR is not transferred directly to the data processing circuit section 12 as in a conventional disk reproduction apparatus, but the process use information PR is DMA transferred as information-added divisional music data together with divisional compressed music data to the data processing circuit section 12. Therefore, in the recording and reproduction apparatus 1, even if the number of control instructions to be transferred to the data processing circuit section 12 increases together with increase of functions, significant increase of the processing load to the CPU 5 can be prevented when compared with conventional disk reproduction apparatus.

Further, in the recording and reproduction apparatus 1, since the initialization instruction information IN for the data decompressor 23 is added as process use information PR in advance to divisional compressed music data, even if the CPU 5 does not normally monitor the situation of the decompression process for divisional compressed music data and the initialization instruction information IN is not transferred in a timed relationship with the decompression process, the data decompressor 23 can be initialized precisely by the data processing circuit section 12. Consequently, the processing load to the CPU 5 can be further reduced.

Furthermore, in the recording and reproduction apparatus 1, the capacity of the buffer memory 19 is greater than the capacity of the temporary storage area for information-added divisional music data of the RAM 7. Therefore, in the recording and reproduction apparatus 1, although the CPU 5 operates in accordance with the basic program and consequently operates asynchronously with the data processing circuit section 12, the reproduction process of the divisional compressed music data placed in the information-added divisional music data can be started in a state wherein a greater amount of information-added divisional music data than that of the RAM 7 is accumulated in the buffer memory 19. Accordingly, in the recording and reproduction apparatus 1, even if the DMA transfer of information-added divisional music data to the data processing circuit section 12 is temporarily interrupted by PIO transfer of a control instruction, otherwise possible interruption of the reproduction process for the divisional compressed music data can be prevented substantially with certainty.

Furthermore, in the recording and reproduction apparatus 1, while the CPU 5 successively produces information-added divisional music data from compressed music data and corresponding attribute information, the CPU 5 confirms the reading out situation of information-added divisional music data from the RAM 7, and when the reading out of information-added divisional music data from the RAM 7 is temporarily interrupted, the CPU 5 PIO transfers a reproduction starting instruction to the data processing circuit section 12. In other words, in the recording and reproduction apparatus 1, when information-added divisional music data of an amount equal to the capacity of the buffer memory 19 is temporarily stored into the buffer memory 19, such a situation that the DMA transfer is interrupted inevitably is entered. Accordingly, in the recording and reproduction apparatus 1, when a reproduction starting instruction is transferred from the CPU 5 to the data processing circuit section 12, even if interruption of the DMA transfer of information-added divisional music data is applied to compulsorily interrupt the DMA transfer, it is possible to readily cause the DMA controller 18 to abandon the use right of the bus 4 once, and consequently, the reproduction starting instruction can be PIO transferred readily.

Figure 11:
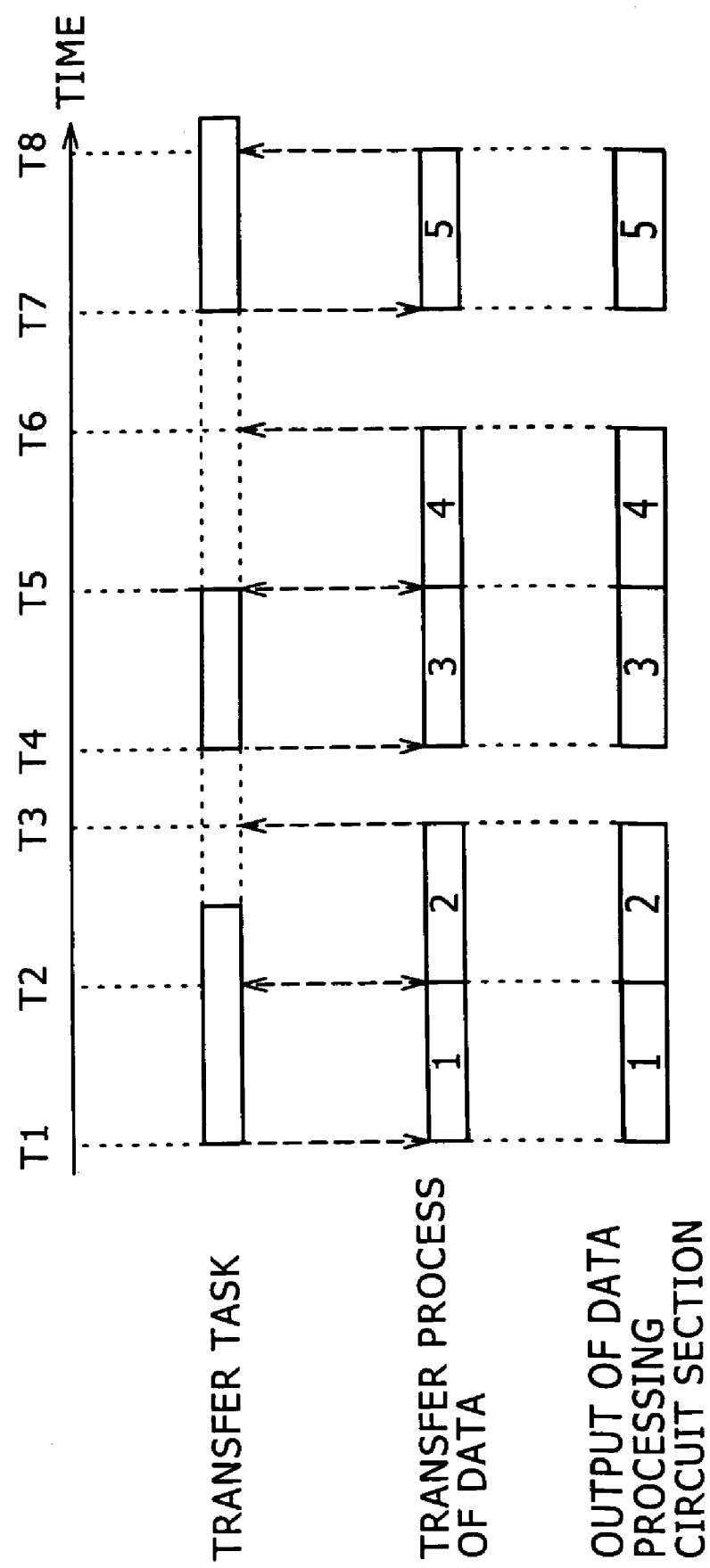
FIG. 11 is a diagrammatic view illustrating transfer of data by a CPU where a buffer memory has a small capacity in the recording and reproduction apparatus of FIG. 1.

It is to be noted that, in the foregoing description of the present embodiment, the DMA controller 18 DMA transfers information-added divisional music data from the RAM 7 to the buffer memory 19 of the data processing circuit section 12 through the bus 4. However, the present invention is not limited to this, and the CPU 5 may transfer information-added divisional music data from the RAM 7 to the buffer memory 19 of the data processing circuit section 12 through the bus 4 without using the DMA controller 18.

Where the CPU 5 transfers information-added divisional music data without using the DMA controller 18 in this manner, transfer of new information-added divisional music data is started when completion of transfer of information-added divisional music data is confirmed after transfer of such information-added divisional music data is started within a task for data transfer (hereinafter referred to as transfer task) as seen in FIG. 11. Therefore, even if a notification of completion of transfer of information-added divisional music data is received while the CPU 5 executes a process allocated to a task different from a transfer task, the CPU 5 cannot confirm the completion of transfer until a next transfer task comes. Thus, transfer of information-added divisional music data is interrupted within a period from time T3 to time T4 or from time T6 to time T7 in FIG. 11. Then, if it is assumed that the capacity of the buffer memory 19 of the data processing circuit section 12 is smaller than the capacity of the temporary storage area for information-added divisional music data in the RAM 7, then since a large amount of information-added divisional music data cannot be accumulated in the buffer memory 19, when transfer of information-added divisional music data from the RAM 7 to the buffer memory 19 is interrupted, also outputting of divisional compressed music data from the data processing circuit section 12 is interrupted accordingly. As a result, also the music to be outputted from the speaker 14 is interrupted.

Figure 12:
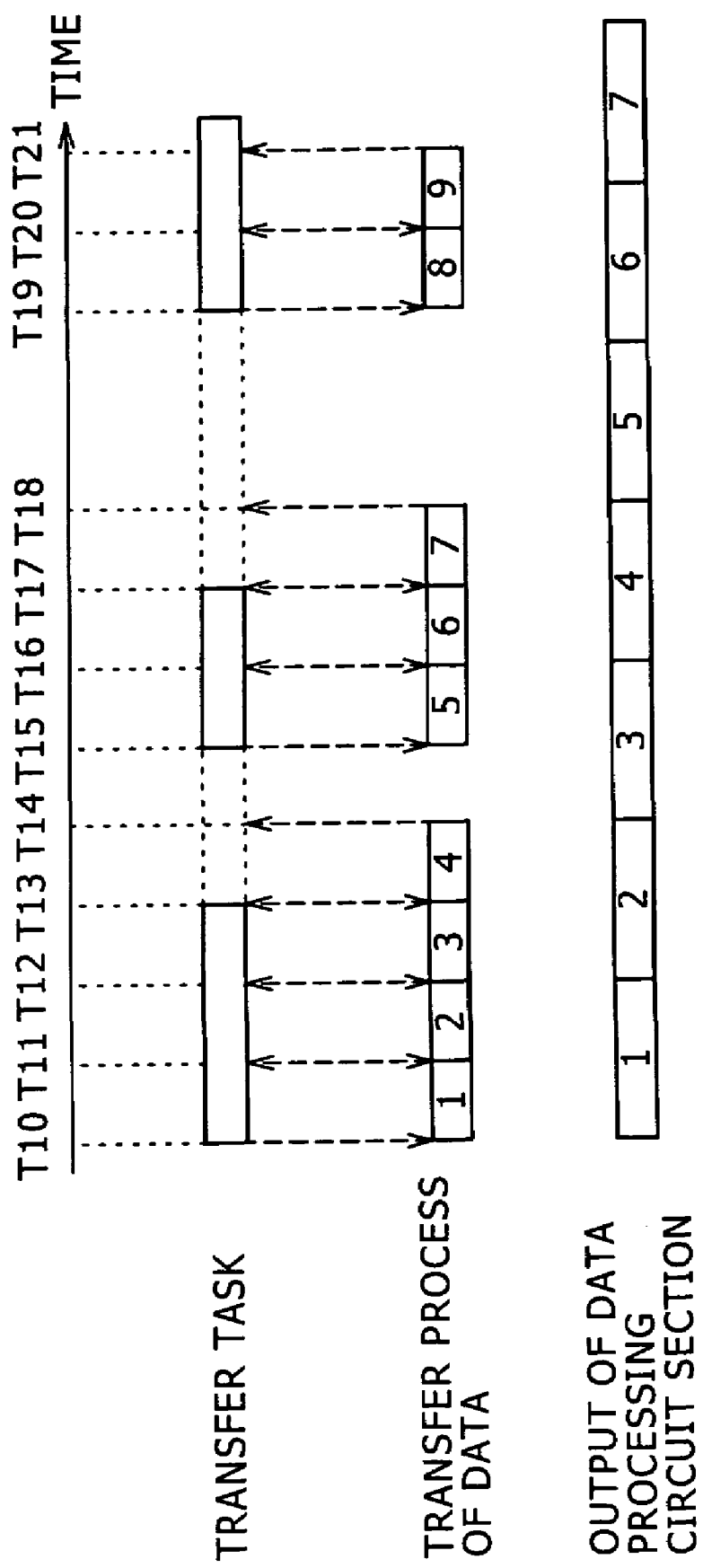
FIG. 12 is a diagrammatic view illustrating transfer of data by the CPU where the buffer memory has a large capacity in the recording and reproduction apparatus of FIG. 1.

However, as seen in FIG. 12, also where information-added divisional music data are transferred without using the DMA controller 18, if the capacity of the buffer memory 19 of the data processing circuit section 12 is set greater than the capacity of the temporary storage area for information-added divisional music data in the RAM 7 as in the embodiment described above, the CPU 5 can transfer information-added divisional music data at a high speed from the RAM 7 to the buffer memory 19 so as to be accumulated into the buffer memory 19 without paying attention to reading out of information-added divisional music data from the buffer memory 19 to the data decompressor 23 side at all. Therefore, even if a notification of completion of transfer of information-added divisional music data is received while the CPU 5 executes a process allocated to a task different from a transfer task and therefore the CPU 5 cannot confirm the completion of transfer similarly as in the case described hereinabove with reference to FIG. 11 and, as a result, the transfer of information-added divisional music data is interrupted within a period from time T14 to time T15 or from time T18 to time T19 in FIG. 12, interruption of outputting of divisional compressed music data from the recording and reproduction apparatus 1 can be prevented for a period of time as a large amount of information-added divisional music data can be accumulated in the buffer memory 19. Consequently, also interruption of the music to be outputted from the speaker 14 can be prevented.

Further, in the embodiment described above, the initialization instruction information IN is placed as the process use information PR in the header part HD of the information-added divisional music data. However, the present invention is not limited to this, and the CPU 5 may transfer the initialization instruction information IN as an initialization instruction as a control instruction for real time processing to the controller 21 of the data processing circuit section 12 without placing the initialization instruction information IN in the header part HD of the information-added divisional music data. Where the initialization instruction information IN is transferred in this manner, even if the CPU 5 receives a request to freely change the reproduction rate linearly from the user during reproduction of compressed music data, the CPU 5 can initialize the data decompressor 23 precisely in accordance with a form of a decompression process for divisional compressed music data suitable for the reproduction speed. Also as regards a sound quality adjustment instruction, where a unique setting for sound quality adjustment is determined for each tune in advance, a sound quality adjustment instruction signal indicative of the substance of the setting can be placed in the header part HD of the information-added divisional music data as the process use information PR. Further, for example, where it is possible to issue a request for notification of whether or not a predetermined process which can be executed by the data processing circuit section 12 is arbitrarily executed, it is possible for the CPU 5 to transfer a process execution changeover instruction representative of whether or not such a predetermined process is executed as a control instruction for real time processing to the controller 21 of the data processing circuit section 12. Then, the data processing circuit section 12 can change over whether or not the predetermined process is executed by a circuit which can execute a corresponding predetermined process in accordance with the process execution changeover instruction by real time control and besides can real time control whether or not the process use information PR is detected by the information detector 22 in response to whether or not the predetermined process is executed. If information whose use in a data process is settled in advance such as, for example, setting information of an equalizer is placed as the process use information PR in the header part HD of the information-added divisional music data and only a control instruction which is an equalizer setting request is transferred from the CPU 5 directly to the data processing circuit section 12, then the controller 21 can real time control the information detector 22 to detect the setting information for the equalizer from the header part HD of the information-added divisional music data. In other words, only if the CPU 5 transfers the equalizer setting request to the data processing circuit section 12, then the data processing circuit section 12 can perform data processing on the real time basis. In this manner, the present recording and reproduction apparatus 1 can process data precisely while reducing the processing load to the CPU 5.

Further, in the embodiment described above, the DMA controller 18 is provided in the data processing circuit section 12. However, the present invention is not limited to this, and the DMA controller 18 may be provided externally of the data processing circuit section 12 only if it is connected to the bus 4.

Furthermore, in the embodiment described hereinabove, the data processing circuit section 12 passes the process use information PR detected from within the information-added divisional music data by the information detector 22 to the controller 21. However, the present invention is not limited to this, but the process use information PR detected from within the information-added divisional music data by the information detector 22 may be passed directly to the data decompressor 23 without the intervention of the controller 21. This can reduce the processing load to the controller 21.

Further, in the embodiment described above, the data processing circuit according to the present invention is applied to the data processing circuit section 12 having a circuit board configuration which reproduces divisional compressed music data described hereinabove with reference to FIGS. 1 to 10. However, the present invention is not limited to this, but can be applied widely to data processing circuits of various configurations including data processing circuits which perform various data processes such as a reproduction process, an encryption process, a compression coding process and a decryption process for various data such as video data, photograph image data, text data and game programs and data processing circuits of a circuit board configuration which are removably provided in data processing apparatus.

Further, in the embodiment described above, the data processing apparatus according to the present invention is applied to the recording and reproduction apparatus 1 described hereinabove with reference to FIGS. 1 to 10. However, the present invention is not limited to this, but can be applied widely to data processing apparatus of various configurations like data processing apparatus such as personal computers, portable telephone sets, PDAs (Personal Digital Assistants), game machines, compact disk players, DVD (Digital Versatile Disk) players, Blu-ray players, HD-DVD (High Definition DVD) players, memory players, hard disk recorders and television receivers which include a data processing circuit.

Further, in the embodiment described above, the data processing program according to the present invention is applied to the data processing program stored in advance in the memory of the DSP 20 described hereinabove with reference to FIGS. 1 to 10. However, the present invention is not limited to this, but can be applied widely to data processing programs of various other configurations.

Further, in the embodiment described above, the data processing program according to the present invention is applied to the data processing control program stored in advance in the ROM 6 or the hard disk drive 9 of the recording and reproduction apparatus 1 described hereinabove with reference to FIGS. 1 to 10 such that the CPU 5 of the recording and reproduction apparatus 1 executes the data production processing procedure described hereinabove with reference to FIG. 6 in accordance with the data processing control program and executes the data processing control processing procedure described hereinabove with reference to FIGS. 7 and 8. However, the present invention is not limited to this, but may apply data processing control programs of various other configurations such that the data production processing procedure and the data processing control processing procedure are executed by installing the program recording medium in which the data processing control program is stored into the recording and reproduction apparatus 1.

Furthermore, in the embodiment described hereinabove, the buffer memory 19 in the data processing circuit section 12 described hereinabove with reference to FIGS. 1 to 10 is applied as the buffer memory for temporarily storing data to which attribute information is added. However, the present invention is not limited to this, but buffer memories of various other configurations can be applied widely like the buffer memory provided externally of the data processing circuit section 12.

Further, in the embodiment described hereinabove, the divisional compressed music data described hereinabove with reference to FIGS. 1 to 10 are applied as the data read out from the buffer memory and having the attribute information added thereto. However, the present invention is not limited to this, and various data such as video data, photograph image data, text data and game programs can be applied widely.

Further, in the embodiment described hereinabove, the information detector 22 which is one of the functions of the DSP 20 described hereinabove with reference to FIGS. 1 to 10 is applied as the information detection section for detecting the attribute information from the data read out from the buffer memory and having the attribute information added thereto. However, the present invention is not limited to this, but various other information detection elements can be applied widely like an information detector or the like of a hardware circuit configuration which detects the attribute information from the data read out from the buffer memory and having the attribute information added thereto.

Further, in the embodiment described above, the data decompressor 23 which is one of the functions of the DSP 20 described hereinabove with reference to FIGS. 1 to 10 is applied as the data processing section for processing data to which attribute information is added in response to the attribute information detected by the information detection section. However, the present invention is not limited to this, but various other data processing elements can be applied widely like a data processor or the like of a hardware configuration which applies various data processes such as a reproduction process, an encryption process, a compression coding process and a decryption process for data to which attribute information is added in response to the attribute information detected by the information detection section.

Further, in the embodiment described above, the sound quality adjustment instruction described hereinabove with reference to FIGS. 1 to 10 is applied as a control instruction for real time processing to be inputted from the outside. However, the present invention is not limited to this, but various other control instructions can be applied widely like a picture quality adjustment instruction.

Further, in the embodiment described above, the controller 21 which is one of the functions of the DSP 20 described hereinabove with reference to FIGS. 1 to 10 is applied as the real time control section for real time controlling at least one of the information detection section and the data processing section in accordance with a control instruction for real time processing inputted from the outside. However, the present invention is not limited to this, but various other real time control elements can be applied widely like a real time controller or the like of a hardware circuit configuration which real time controls at least one of a plurality of elements on a data processing circuit in response to a control instruction for real time processing inputted from the outside.

Furthermore, in the embodiment described above, the CPU 5 described hereinabove with reference to FIGS. 1 to 10 is applied as the control instruction signaling section for signaling a control instruction for real time processing to the real time control section of the data processing circuit. However, the present invention is not limited to this, but various other control instruction signaling elements can be applied widely like a microprocessor.

While a preferred embodiment of the present invention has been described using specific terms, such description is for illustrative purpose only, and it is to be understood that changes and variations may be made without departing from the spirit or scope of the following claims.

What is claimed is:

1. A data processing circuit, comprising:
   an information detection section configured to detect, from within data read out from a buffer memory and having attribute information, the attribute information;
   a data processing section configured to process, in response to the attribute information detected by said information detection section, data corresponding to the attribute information; and
   a real time control section configured to real time control at least one of said information detection section and said data processing section in accordance with a control instruction for real time processing inputted from the outside.

2. The data processing circuit according to claim 1, wherein said data processing section adjusts the quality of the data on the real time basis under the real time control by said real time control section.

3. The data processing circuit according to claim 1, wherein said information detection section detects initialization instruction information for initializing said data processing section from within the data having the attribute information, and said data processing section performs, when the attribute information and the initialization instruction information are detected from within the data by said information detection section, an initialization action in accordance with the detected initialization instruction information.

4. A data processing apparatus, comprising:
   a data processing circuit including a buffer memory configured to temporarily store data having attribute information, an information detection section configured to detect the attribute information from the data read out from said buffer memory and having the attribute information, a data processing section configured to process, in response to the attribute information detected by said information detection section, data corresponding to the attribute information, and a real time control section configured to real time control at least one of said information detection section and said data processing section in accordance with a control instruction for real time processing.

5. The data processing apparatus according to claim 4, wherein said real time control section of said data processing circuit includes a control instruction signaling section for signaling the control command for real time processing and real time controls said data processing section in accordance with the control instruction signaled from said control instruction signaling section, and said data processing section of said data processing circuit adjusts the quality of the data on the real time basis under the real time control by said real time control section.

6. The data processing apparatus according to claim 4, wherein said information detection section of said data processing circuit detects initialization instruction information for initializing said data processing section from within the data having the attribute information, and said data processing section of said data processing circuit performs, when the attribute information and the initialization instruction information are detected from within the data by said information detection section, an initialization action in accordance with the detected initialization instruction information.

7. A data processing method, comprising:
   an information detection step of detecting, from within data read out from a buffer memory and having attribute information, the attribute information;
   a data processing step of processing, in response to the attribute information detected at the information detection step, data corresponding to the attribute information; and
   a real time control step of real time controlling at least one of the processes executed at the information detection step and the data processing step in accordance with a control instruction for real time processing inputted from the outside.

8. The data processing method according to claim 7, wherein, at the data processing step, the quality of the data is adjusted on the real time basis under the real time control by the real time control step.

9. The data processing method according to claim 7, wherein, at the information detection step, initialization instruction information for initializing the data processing step is detected from within the data having the attribute information, and at the data processing step, when the attribute information and the initialization instruction information are detected from within the data at the information detection step, an initialization action is performed in accordance with the detected initialization instruction information.

10. A data processing control method, comprising:
    a temporarily storing step of signaling, to a data processing circuit including a buffer memory configured to temporarily store data having attribute information, an information detection section configured to detect the attribute information from the data read out from said buffer memory and having the attribute information, a data processing section configured to process, in response to the attribute information detected by said information detection section, data corresponding to the attribute information, and a real time control section configured to real time control at least one of said information detection section and said data processing section in accordance with a control instruction for real time processing, the data having the attribute information so as to be temporarily stored into said buffer memory; and a control instruction signaling step of signaling, when the attribute information is detected from within the data read out from said buffer memory and having the attribute information by said information detection section of said data processing circuit and the data corresponding to the attribute information detected by said information detection section are processed in response to the attribute information by said data processing section, the control instruction for real time processing to said real time control section of said data processing circuit to cause said real time control section of said data processing circuit to perform the real time control of at least one of said information detection section and said data processing section in accordance with the control instruction.

11. The data processing control method according to claim 10, wherein, at the control instruction signaling step, the control signal for causing said data processing section of said data processing circuit to adjust the quality of the data on the real time basis is signaled to said real time control section of said data processing circuit to cause said data processing circuit to adjust the quality of the data on the real time basis under the real time control by said real time control section.

12. The data processing control method according to claim 10, wherein, at the temporarily storing step, the data including initialization instruction information for initializing said data processing section and the attribute information are signaled to said data processing circuit and the signaled data are temporarily stored into said buffer memory such that, when the attribute information and the initialization instruction information are detected from within the data by said information detection section of said data processing circuit, said data processing circuit executes an initialization action of said data processing circuit itself in accordance with the initialization instruction information.

13. A storage medium on which a data processing program is recorded, the data processing program causing a data processing circuit to execute:

an information detection step of detecting, from within data read out from a buffer memory and having attribute information, the attribute information;

a data processing step of processing, in response to the attribute information detected at the information detection step, data corresponding to the attribute information; and a real time control step of real time controlling at least one of the processes executed at the information detection step and the data processing step in accordance with a control instruction for real time processing inputted from the outside.

14. A storage medium on which a data processing control program is recorded, the data processing control program causing a data processing circuit, which includes a buffer memory configured to temporarily store data having attribute information, an information detection section configured to detect the attribute information from the data read out from said buffer memory and having the attribute information, a data processing section configured to process, in response to the attribute information detected by said information detection section, data corresponding to the attribute information, and a real time control section configured to real time control at least one of said information detection section and said data processing section in accordance with a control instruction for real time processing, to execute:

a temporarily storing step of signaling the data including the attribute information to said data processing circuit so as to be temporarily stored into said buffer memory; and a control instruction signaling step of signaling, when the attribute information is detected from within the data read out from said buffer memory and having the attribute information by said information detection section of said data processing circuit and the data corresponding to the attribute information detected by said information detection section are processed in response to the attribute information by said data processing section, the control instruction for real time processing to said real time control section of said data processing circuit to cause said real time control section of said data processing circuit to perform the real time control of at least one of said information detection section and said data processing section in accordance with the control instruction.

* * * * *